United States Patent

Itoh

[11] Patent Number: 6,034,785
[45] Date of Patent: Mar. 7, 2000

[54] IMAGE SYNTHESIZING METHOD

[75] Inventor: Shinji Itoh, Kanagawa, Japan

[73] Assignee: Fuji Photo Film Co., Ltd., Kanagawa, Japan

[21] Appl. No.: 09/063,045

[22] Filed: Apr. 21, 1998

[30] Foreign Application Priority Data

Apr. 21, 1997 [JP] Japan .................................. 9-103590

[51] Int. Cl.[7] .................................................. G06H 15/00
[52] U.S. Cl. .......................................... 358/1.18; 358/1.6
[58] Field of Search .............................. 358/1.1, 1.2, 1.6, 358/1.18, 515, 517, 518, 527, 537, 538, 540; 345/418, 428, 431, 433, 434, 435, 439, 113, 114, 115, 118, 156, 153; 707/517, 520, 528

[56] References Cited

U.S. PATENT DOCUMENTS 4,956,703  9/1990  Uzuda et al. .............................. 358/76
5,410,642  4/1995  Hakamatsuka et al. ................ 395/101

FOREIGN PATENT DOCUMENTS 4-346332  12/1992  Japan .
4-346334  12/1992  Japan .
6-186652   7/1994  Japan .

Primary Examiner—Arthur G. Evans

[57] ABSTRACT

The improved image synthesizing method of the invention which creats digital composite image data by synthesizing a background image and an image read from an original comprises: previously designating a position and a size of the read image which will be inserted into and synthesized with the background image on an output print; scanning and reading the original by a scanner in accordance with the designated size and converting the read image into read image data having the designated size and a resolution of the output print; and automatically synthesizing the converted read image data and the background image data synthesizing the read image having the designated size at the position designated on the background image. The method is capable of automatically reading an image of a user's original after the user's original is set to a scanner, automatically converting the read image into read image data having a designated size and a designated resolution and automatically synthesizing the image and background image data so that the read image of the user's original can be accurately and completely inserted into an image inserting region or an image frame of a background image.

9 Claims, 8 Drawing Sheets

(a)

(b)

IMAGE SYNTHESIZING METHOD

BACKGROUND OF THE INVENTION

1. Field of the Invention

The present invention relates to an image synthesizing method of outputting a print image in which characters such as an address, name, arbitrarily-created sentence and the like, a background image such as a previously prepared image and the like and an image read from a film original and the like are synthesized in a composite print image, in which a digital sentence and an image are synthesized, such as a picture postcard and the like used as New Year's cards, greeting cards and notices.

2. Description of the Related Art

Conventionally, a large number of postal cards on which a photograph is printed, namely, so-called picture postcards have been used as New Year's cards, notices of marriage and the like. The picture postcard is composed of a print image having characters and a photographic image combined therein and formed on a base sheet such as a New Year postal card, a standard postal card and the like. In these picture postcards, since it is conventionally required to print (expose) characters such as an address, name, arbitrarily-created sentence and other predetermined sentence before a negative film or a positive film of a customer (user) is printed (exposed) using an image mask, these characters must be prepared as a block copy and then printed (exposed) to another film such as a lith film or the like using an image mask. In addition, in case of, for example, a New Year's card, a predetermined image (template image, base sheet image) such as "New Year's decorative pine trees" or the like must be printed as a background image using an image mask. Creation of the prior art picture postcards requires at least a total of three films, i.e., the lith film for characters and the respective films for the user's image and the predetermined image for each case. The three films are arranged as one set for each case and loaded on a prior art analog printer and a composite image formed by the thus set three films and having characters and an image synthesized therein is repeatedly printed onto photosensitive materials (papers) by exposing the surfaces of them using an image mask for a necessary period or time, so that a necessary number of sheets, for example, 50 sheets, 100 sheets, 200 sheets, 1000 sheets, etc. on which the composite image is formed are prepared. The predetermined number of the thus obtained print images are developed, cut off one by one and bonded on postal cards such as official postal cards, private postal cards and the like and base sheets and the like using a dedicated bonding machine and picture postcards are created.

Incidentally, since Chinese characters peculiar to a user are sometimes used to an addresses, name and the like, even analogous Chinese characters must be often corrected because a delicate difference is required thereto. In the prior art analog printer, since a lith film dedicated to characters must be prepared for each case through creation of a block copy, exposure and development, however, there is a problem that correction of Chinese characters is time-consuming and troublesome. The composite image is obtained by arranging the three films, namely, the character film, the user's image film and the predetermined image film as one set. Since a lot of cases must be processed in a short period of time at the end of a year when New Year's cards and the like are created, a large number of predetermined images such as base sheet images and the like must be prepared if they are popular among many users or a certain number of predetermined images must be rearranged one after another. There is an increased possibility that the rearrangement is erroneously carried out, by which a problem arises in that costs are increased. In addition, although multiple print must be effected using image masks to form the image window of a user's image to various shapes, there is a problem that the multiple print is very troublesome.

In contrast, there have been recently proposed digital print systems making use of digital exposure which are arranged such that image information recorded on a photographic film original (hereinafter, referred to as a film original) such as a negative film, a reversal film and the like is photoelectrically read, the read image is converted into a digital signal and subjected to various steps of image processing to provide recording image information, a photosensitive material such as a printing paper or the like is scan exposed by recording light modulated in accordance with the image information to thereby record an image (latent image) and the image is developed and printed. Digital photoprinters for embodying the systems are being developed.

The digital print system can optionally perform editing such as combination of a plurality of images to a composite image, division of a single image into segments and the like, editing of print images such as editing of characters and images, and various types of image processing such as layout, color/density adjustments, magnification, contour enhancement (sharpness) and the like and output finished prints which have been optionally edited and subjected to image processing in accordance with various uses. Further, prior art print systems employing direct exposure cannot reproduce all the image density information recorded on a film and the like in such aspects as density resolution, space resolution, color/density reproducibility, etc., while the digital photoprinter can output prints in which approximately 100% of the image density information recorded on a film is reproduced.

The digital photo print system and a digital photoprinter is fundamentally provided with an image input device (scanner) for photoelectrically reading an image recorded on an original such as a film or the like through an image sensor or the like, a display device (display) for displaying the read image or a composite image in which the read image, a predetermined image and characters are synthesized, an input device for inputting characters such as an address, name, arbitrarily-created sentence and the like and various numbers and conditions, a controller for controlling the system as a whole, an image processing device for subjecting the read image to image processing and synthesizing the read image, the predetermined image and a character image such as the address, name and the like and subjecting the resultant composite image to the image processing and an image output device for scan exposing a photosensitive material with an exposing beam such as a laser beam or the like which is modulated in accordance with the image information having been subjected to the image processing.

According to the digital print system arranged as described above, it is possible in the image processing device to store and keep digital image data such as images recorded on respective films, predetermined images such as a base sheet image (template image) and the like, bitmap-created predetermined sentences and the like and their image processing conditions in a memory device such as a non-volatile memory, for example, an EEPROM, EPPOM and the like provided with the digital photoprinter and in a memory medium such as a FD (floppy disc), MO (magneto-optical recording medium) and the like. Since a predetermined image and a predetermined sentence need not be created for each case when a picture postcard and the like are made as well as since a composite image in which an image read from a film original of a user, a predetermined image such as a template image and a character image such as an address, name, predetermined sentence and the like are combined (or synthesized) is displayed on the display device, modifications and corrections can be easily and accurately performed. When composite image data is created once, a necessary number of prints can be continuously and automatically output by the image output device using the laser beam or the like. Thus, the picture postcards can be easily, accurately and effectively made.

When picture postcards are made using the digital print system arranged as described above, a user's image read from an original such as a negative film or a reversal film presented by the user must be accurately synthesized in an image inserting region, namely, an image frame which is designated in a background image selected by the user. Since the shape and size of a user's original image does not usually coincide with a shape and size of the image region or the image frame designated in the background image and a resolution when the user's original image is read through the scanner does not usually coincide with an output resolution of the digital printer, read image data is subjected various steps of processing. When background image data and read image data are synthesized only by simply causing their sizes and resolutions to coincide with each other, there arises a problem that the read image inserted into and synthesized with the background image is displaced forward, backward, rightward and leftward or turned and distorted, since the size of the read image is too small, the border of an original appears or since it is too large, a necessary picture is chipped off. There is a possibility that an image desired by the user cannot be obtained.

To cope with the above problem, the read original image is displayed on the display device such as a monitor or the like. Since there are various steps of processing until the read original image is synthesized with the background image and output as the composite print image by being finally exposed and developed, however, a problem also arises in that an image displayed on the monitor does not always coincide with an image inserted into the composite print image. In particular, since the image frame of the background image which is selected by the user does not always has a rectangular shape which is similar to the film original, there is also a problem that an image inserted into a resultant composite print image is different from the image desired by the user. Further, even the digital print system capable of displaying a reproduced image on a monitor cannot display an image inserted into a composite image frame and does not take the defect, namely, so-called vignetting of an image caused in various steps of processing into consideration. Thus, there is a problem that only the confirmation of the image displayed on the monitor cannot permit the read image to be completely and accurately inserted into the image frame of the background image.

Further, a problem arises in that it is very time-consuming and wasteful to repeat test prints of the composite image until the read image is completely and accurately inserted into the image frame of the background image.

SUMMARY OF THE INVENTION

An object of the present invention is to solve the above problems of prior art and to provide an image synthesizing method capable of automatically reading an image of a user's original after the user's original is set to a scanner, automatically converting the read image into read image data having a designated size and a designated resolution and automatically synthesizing the image and background image data so that the read image of the user's original can be accurately and completely inserted into an image inserting region or an image frame of a background image which is located at a designated position and has a designated size and can be synthesized therein, in order to manufacture picture postcards having a print image in which characters and an image are synthesized using a digital photoprinter of a digital print system.

Another object of the present invention is to provide an image synthesizing method, in addition to the above object, capable of displaying an original image read through a scanner or a composite image on a monitor, confirming the accuracy and completeness of a read image which has been inserted into a background image and synthesized therewith on a composite print image displayed on the monitor and automatically carrying out the processes from the reading of the user's original to the combination of the user's original and the background image data.

To achieve the above object, the present invention provides an image synthesizing method of creating digital composite image data by synthesizing a background image previously stored as digital image data and an image read from an original, the image synthesizing method comprising the steps of: previously designating a position and a size of the read image which will be inserted into and synthesized with the background image on the background image of an output print; scanning and reading the original by a scanner in accordance with the designated size and converting the read image into read image data having the designated size and a resolution of the output print; and automatically synthesizing the converted read image data and the background image data whose resolution is converted into the resolution of the output print and synthesizing the read image having the designated size at the position designated on the background image.

It is preferable that the original reading process performed in accordance with the designated size is a process for reading the entire image of the original and cutting out image data in a region which is inscribed in the entire image region of the read original and similar to the designated size from the entire image data read from the original. It is preferable that the read image data having been converted is obtained by reading a region containing the image region previously designated to the original from the original image as much as possible by optically magnifying the region, cutting out the image data in the region which is inscribed in the read image region and similar to the designated size and converting the cut-out image data into read image data having the designated size and the resolution of the output print. It is also preferable that the read image data having been converted is data obtained by reading the entire image of the original, cutting out minimum image data containing the image region previously designated to the original and located in a region similar to the designated size and then electronically magnifying the cut-out image data.

It is preferable that the original image read by the scanner is displayed on a monitor and the read image is an image located in a region which is shown as a reference line on the original image displayed on the monitor. It is also preferable that the original image read by the scanner is synthesized with the background image and displayed on the monitor and the read image is displayed in an image frame which is shown as a reference line on the background image displayed on the monitor.

It is preferable that the read image displayed in the reference line on the monitor is adjusted by at least any one of the change of an optical magnification of the image pickup lens of the scanner, the positional adjustment of a carrier for holding the original, the positional adjustment of the original on the original carrier and the adjustment of the cut-out pixels of the image data cut out from the read original image data.

It is preferable that the read image in the reference line is displayed in enlargement on the monitor together with the reference line.

Further, it is preferable that the read image displayed on the monitor is a prescan image read at a low resolution and after it is confirmed that the read image is proper, the original is read at a high resolution by the scanner which performs main-scan.

DESCRIPTION OF THE PREFERRED EMBODIMENT

An image synthesizing method according to the present invention will be described below in detail with reference to a preferred embodiment shown in the accompanying drawings.

Figure 1:
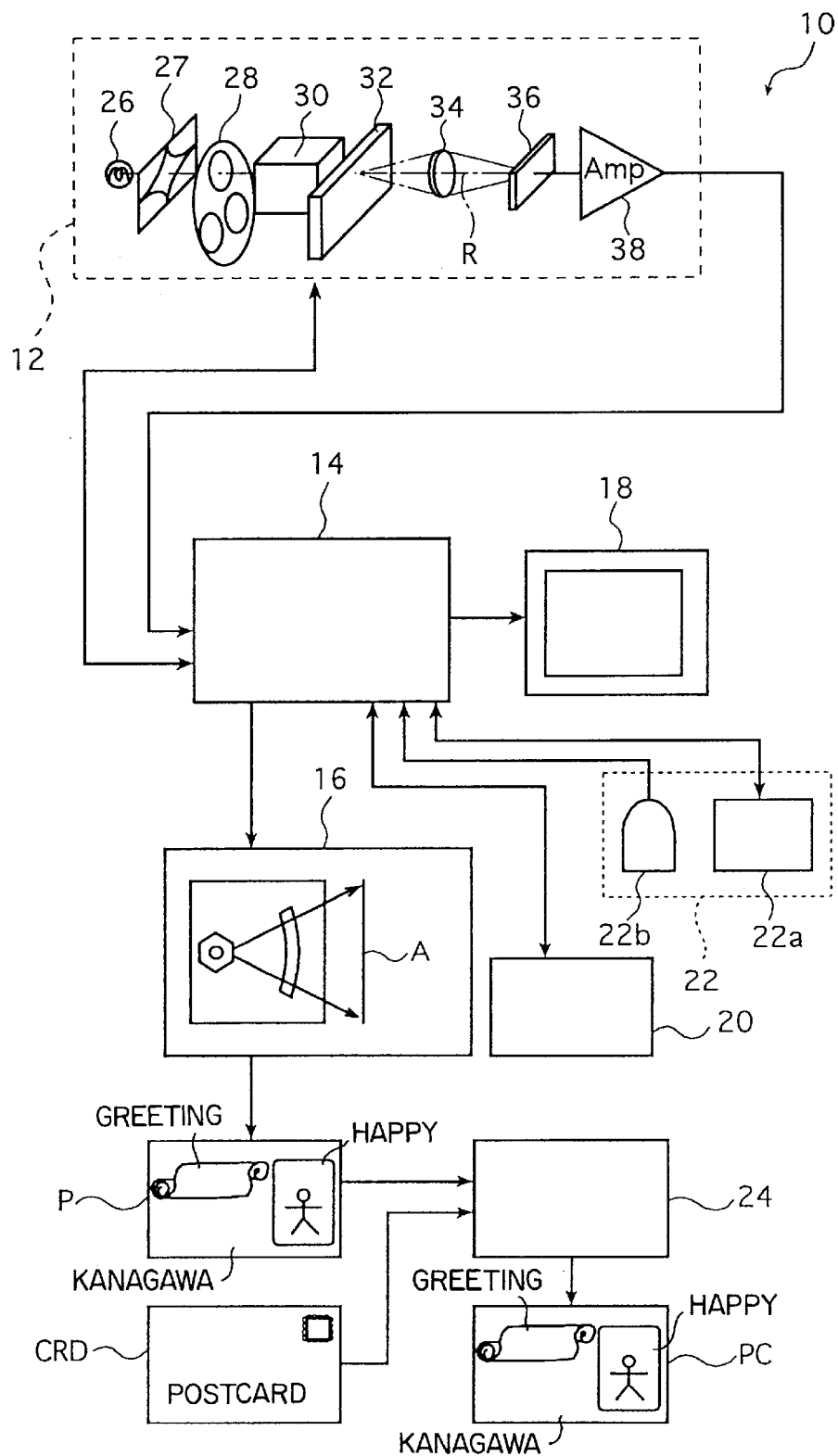
FIG. 1 is a block diagram of an embodiment of a digital print system embodying an image synthesizing method according to the present invention.

FIG. 1 is a schematic block diagram of an embodiment of a digital print system embodying the image synthesizing method of the present invention.

In the following description, a picture postcard such as a New Year's card and the like, in which a customer's recorded image, a background image having a picture associated with the New Year's greetings, predetermined characters and predetermined sentences such as "Happy New Year", "Greeting" and the like associated with the New Year's greetings, and characters such as the address, name and arbitrarily-created sentence and the like of a customer are synthesized, is used as a typical example of a subject to which the image synthesizing method of the present invention is applied. However, the present invention is not limited thereto and any subject may be suitably selected in accordance with a use and gist thereof.

A digital print system 10 shown in FIG. 1 includes an image input device (hereinafter, also referred to as a scanner) 12 for photoelectrically reading an image carried by an original such as a film original or the like brought by a customer, a controller 14 for performing a digitally synthesizing process for synthesizing an image read by the scanner 12, a background image designated by the customer and characters such as the address, name, arbitrarily-created sentence and the like of the customer and controlling the digital print system 10 as a whole, an image output device (hereinafter, also referred to as a printer) 16 for subjecting a photosensitive material to image exposure based on a digitally synthesized image signal synthesized by the controller 14, developing the photosensitive material and outputting a print P on which a composite image is carried, an image display device (hereinafter, also referred to as a monitor or a display) 18 for displaying the original image read by the scanner 12 and the composite image synthesized by the controller 14, a memory device 20 for storing background images (template files) for respective cases before they are subjected to the synthesizing process together with job files, character images, read original images, digitally synthesized images and further various processing conditions and the like, a data input device 22 such as a keyboard 22$a$, a mouse cable 22$b$ and the like for inputting character data such as the addresses, names, arbitrarily-created sentences of the customers, performing an input operation for creating the job files and the like, permitting the customer to select or designate the background images and predetermined sentences, setting various conditions and selecting steps of processing and inputting information as to correction and the like and a bonding machine 24 for bonding a print, in which characters and an image output from the printer 16 are synthesized, onto a base sheet CRD such as a New year's card, a standard postal card and the like and making a picture postcard PC.

The scanner 12 is a device for photoelectrically reading an image of one frame recorded on a film original (hereinafter, simply referred to as a film) or the like and includes a light source 26, a variable diaphragm 27, a color filter plate 28 which has three R, G and B color filters for decomposing the image into the three primary colors of R (red), G (green) and B (blue) and makes a turning motion for causing an arbitrary one of the color filters to act on a light passage, a diffusion box 30 for uniformly diffusing reading light incident on the film in a plane direction vertical to the optical axis of the film, a film carrier 32 (hereinafter, referred to as a carrier 32) for sequentially carrying the respective frames of the film to a predetermined reading position Z, an imaging lens unit 34, a CCD sensor 36 as an area sensor for reading the image of one frame of the film and an amplifier 38.

In the scanner 12, the reading light, which was emitted from the light source 26 and diffused by the diffusion box 30 with its quantity and color adjusted by the variable diaphragm 27 and the color filter plate 28, respectively, enters the image of one frame of the film positioned by the carrier 32 at the reading position Z corresponding to the light axis R and passes through the film to thereby obtain projecting light which carries the image recorded on the one frame of the film.

In the illustrated digital print system (hereinafter, simply referred to as a print system) 10, the carrier 32 can be mounted to a predetermined position of the main body of the scanner 12. The illustrated example is provided with dedicated carriers which can be mounted on the main body of the scanner 12 in accordance with a configuration of a film such as a type, size, slide and the like and various types of processing to be applied to the film such as trimming and the like. The replacement of a mounted carrier permits a reading operation to be performed in correspondence to various types of films such as conventional 135 size and 240 size negative films, reversal films, a slide and the like and to the various types of processing.

The light projected onto the film is imaged on the light receiving surface of the CCD sensor 36 through the imaging lens unit 34, photoelectrically read by the CCD sensor 36 and a signal output therefrom is amplified by the amplifier 38 and supplied to the controller 14. The CCD sensor 36 is an area CCD sensor having, for example, 1380×920 pixels. In an illustrated apparatus, since the CCD sensor 36 can two-dimensionally move by an amount corresponding to half a pixel in the direction where pixels are disposed, a number of read pixels can be apparently increased up to 4 times.

The scanner 12 reads the image of the one frame three times by sequentially inserting the respective color filters of the color filter plate 28 into the light passage so that the image can be decomposed into the three primary R, G, B colors.

The print system 10 performs prescan by reading the image at a low resolution prior to that the image is read (main-scanned) and output as the image print P in which characters and an image are synthesized in order to adjust a result of the combination of characters and the read image, to display a composite image, in particular, a read image and determine conditions for processing the read image, and the like. Thus, the CCD sensor 36 reads the image of the one frame at least a total of six times.

The image data read by the scanner 12 as described above is output to the controller 14.

Figure 2:
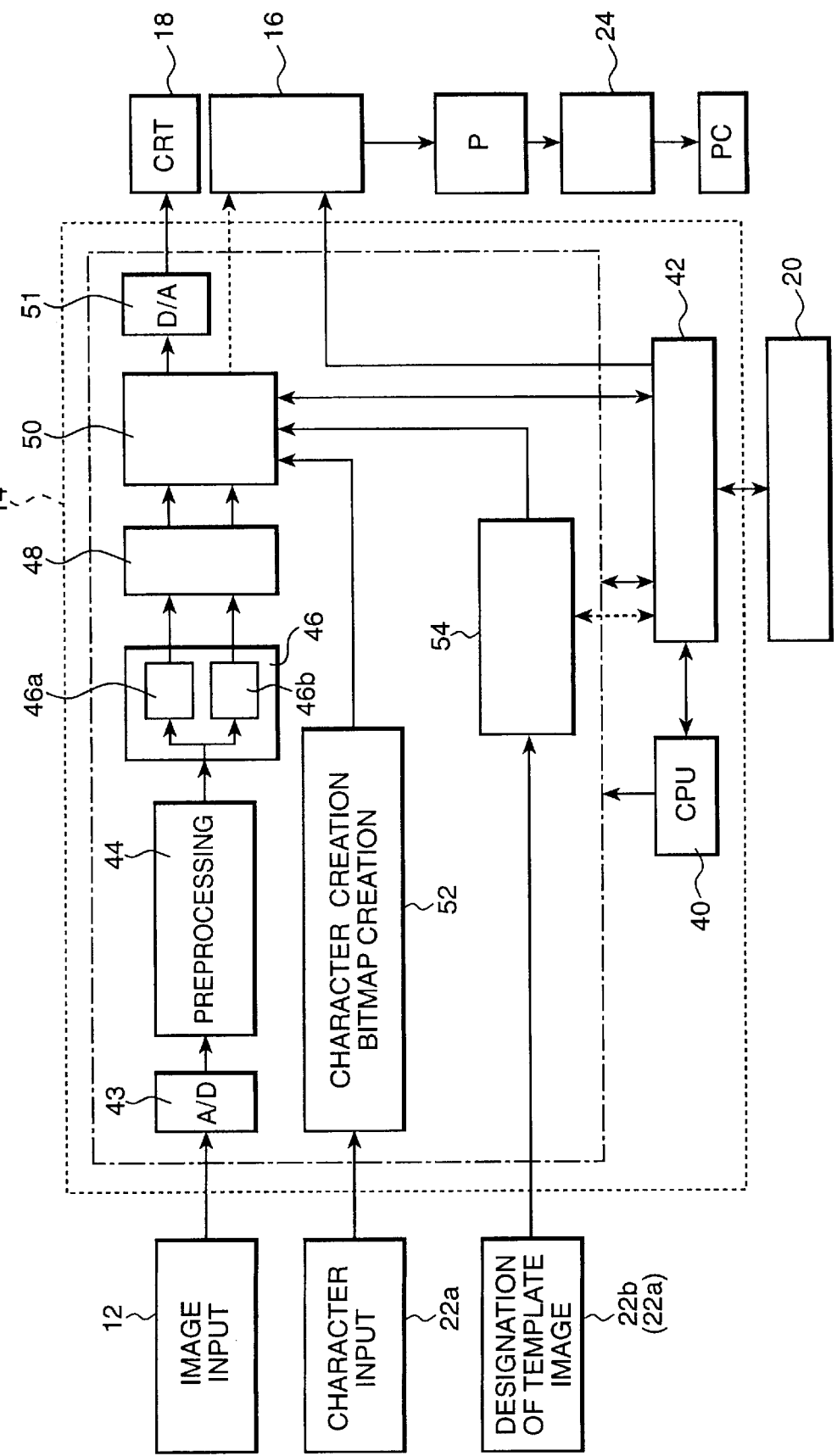
FIG. 2 is a block diagram of an embodiment of a controller of the digital print system shown in FIG. 1.

FIG. 2 shows a block diagram of an embodiment of the controller 14.

As shown in FIG. 2, the controller 14 sets reading conditions of the scanner 12 and controls the scanner 12 based on the reading conditions, converts the image signal read by the scanner 12 into a digital image signal and subjects the signal to image processing, synthesizes the read image, a background image designated by the customer, predetermined characters and a predetermined sentence designated by the customers and characters such as the address, name, arbitrarily-created sentence and the like of the customer as a digital image, subjects the thus synthesized digital composite image signal to image processing, sets composite processing conditions and automatically sets up image processing conditions as well as controls the digital print system 10 as a whole. The controller 14 includes a CPU 40 for controlling an image processing device 15 as well as controlling and managing the print system 10 such as the scanner 12, the controller 14 itself, the printer 16, the bonding machine 24 and the like and a memory 42 for storing data necessary to actuate the digital print system 10, in addition to the image processing device 15 for creating synthesized image data in which the characters and the image are synthesized.

Connected to the respective sections of the controller 14 through the CPU and the like (a CPU bus) are the monitor 18 for displaying a job registration screen of the composite image and the picture postcard system, a list of registered job files and their contents and various types of information of the background images, the memory device 20 for storing the job files which are registered for respective cases of one lot or several lots, composite image data, character image data before they are synthesized, background image data, read image data and the like, the keyboard 22a for inputting data (items) necessary to register the characters and the like such as the addresses, names and arbitrarily-created sentences of the customers and job registration, the mouse 22b for designating background images, a predetermined sentences and the like selected by the customers in the job files and template files (otherwise, their designating symbols such as code numbers and the like may be input through the keyboard 22a), the printer 16 and the like.

The image processing device 15 includes an A/D converter 43, an image preprocessing unit 44, a read image memory (frame memory) 46 having a prescan (frame) memory 46a and a main-scan (frame) memory 46b, an image disposal processing device 48, a composite processing unit 50, a D/A converter 51, a character image data creating device 52 and the background image (template image) memory 54.

The A/D converter 43 converts the R, G and B image data output from the scanner 12 into digital image data, respectively. The preprocessing unit 44 subjects the resultant digital image data to various conversion/correction processes such as DC offset correction, dark correction, Log conversion, shading correction, negative/positive conversion and the like, when necessary. The read image memory (frame memory) 46 stores the resultant preprocessed image signal data and the prescan image data of the preprocessed image signal data is stored in the prescan memory 46a and the main-scan image data thereof is stored in the main-scan memory 46b, respectively. Although the frame memory 46 may be incorporated in the controller 14, a portion of the memory device 20 may be used as the frame memory 46.

The positive/negative conversion executed by the image preprocessing unit 44 converts a negative image read from a negative film into a positive image read from a reversal film or a positive image into a negative image.

The image disposal processing device 48 sets processing conditions (image processing conditions) of the resultant image data as well as subjects the image data to image processing in accordance with the set image processing conditions.

The image disposal processing device 48 first reads the prescan image data from the prescan memory 46a, creates a density histogram, calculates an characteristic amount of an image and sets various image processing conditions such as color/gradation correction, electronic magnification, dynamic range processing, sharpness and the like.

When the image processing conditions are set, the image disposal processing device 48 first turns the image in the prescan image data or the image in the main scanned data read from the main-scan memory 46a when main-scan is executed vertically or laterally (−90° or 90°), turns over the image (±180°) or turns the image an arbitrary angle (±θ) Subsequently, the image disposal processing device 48 corrects the color and/or gradation of the image, subjects the image to enlargement/reduction processing (electronic magnification) in accordance with a set electronic magnification and compresses and/or expands a dynamic range of the image data (application of a dodging effect by image processing) and further subjects the image to sharpness processing using a sharpness mask or the like.

The prescan image processed in accordance with the image processing conditions set by the image disposal processing device 48 is synthesized with characters and a background image (template image) by the subsequent composite processing unit 50 and thereafter displayed on the monitor 18 such as a CRT or the like as a composite image. The operator may examine the prescan image by visually observing the image in the displayed composite image, adjust a color/density, gradation and the like of it and correct the image processing conditions set in accordance with the prescan image, when necessary.

The character image data creating device 52 creates bitmap image data by developing the character data such as the addresses, names, arbitrarily-created sentences and the like of the customer input from the keyboard 22a through the CPU 40 and the memory 42 to a bitmap.

The background image memory 54 stores the digital image data of a plurality of types of background images (referred to as template images or base sheet images) and the bitmap image data of a plurality of types of predetermined characters and predetermined sentences which are previously prepared to the print system 10 in accordance with the uses of picture postcards as template files. The background image data and the bitmap image data of the predetermined characters and the predetermined sentences can be read out from the background image memory 54 by the CPU 40 when the operator designates them in the template file displayed on the monitor 18 through the data input device 22. The frame memory 46 and the background image memory 54 can be allocated to a portion of the memory device 20, although they may be incorporated in the controller 14.

When the customer orders a picture postcard, he can optionally select the background image, predetermined characters and predetermined sentence from a plurality of types of them. The operator can designate the background image, predetermined characters and predetermined sentence by displaying the items of the plurality of types of background images, predetermined characters, predetermined sentences, the character fonts thereof and the like and the designating symbols such as their code numbers and the like which are stored in the background image memory 54 on the display 18 as a template file and designating the items of the background image, predetermined characters and predetermined sentence which were selected by the customer in his order and their designating numbers from the items and the designating numbers in the template file displayed on the display 18 through the mouse 22b. Otherwise, the operator may designates the items of the background image, predetermined characters, predetermined sentence and the like and their designating numbers through the keyboard 22a.

It is preferable to create background images, characters, sentences, the fonts thereof and the like which are not previously prepared using letouch software or the like, for example, Photoshop (made by Adobe) or the like, to convert them to image data or bitmap-created data and additionally add them to the background image memory 54 as a template file.

The composite processing unit 50 is a device for embodying the image synthesizing method of the present invention. The composite processing unit 50 synthesizes the image data output from the image disposal processing device 48, the bitmap character image data output from the character image data creating device 52 and the bitmap image data of the background image and characters read from the background image memory through the CPU 40 so that they are made to normal images each other. The method of synthesizing the characters and the background executed by the composite processing unit 50 will be described later.

When the image data output from the image disposal processing device 48 is main-scanned image data, the composite processing unit 50 stores the image data in which characters and an image are synthesized to the memory 42 or the memory device 20 in accordance with a job file for each case or directly outputs it to the printer 16. Whereas, when the image data output from the image disposal processing device 48 is image data in a video mode in which the images of the customer's film are successively read in monochrome and displayed on the monitor 18 or prescanned image data, it is converted into image data (device-dependent image data) having a resolution (pixel density) and a mode in accordance with the display system of the monitor 18, converted from a digital image data signal into an analog image data signal by the D/A converter 51 and output to the monitor 18. An image in which the characters and the image are synthesized based on the resultant analog image data signal is displayed on the monitor 18.

The CPU 40 controls the image processing device 15 for synthesizing characters and an image as well as controls and manages the print system 10 such as the scanner 12, the controller 14 itself, the printer 16 and the like in accordance with a registered (set) job file. More specifically, the CPU 40 controls and manages the print system 10 as a whole by setting the reading conditions of the scanner 12 and controlling the scanner 12 based on the set reading conditions, converting the image signal read by the scanner 12 into a digital image signal and subjecting the digital image signal to image processing, synthesizing the read image, the background image designated by the customer, the predetermined characters and predetermined sentences designated by the customer and the address, name, arbitrarily-created sentence and the like of the customer as the digital image signal, subjecting the synthesized digital composite image signal to image processing, setting composite processing conditions and automatically setting image processing conditions (automatic setup), executing a printing operation such as the exposure and development of a composite image and controlling the bonding of a composite print image.

The memory 42 stores control data and composite image data necessary to actuate the print system 10. In particular, the memory 42 stores conditions and information for controlling the picture postcard system embodying the image synthesizing method of the present invention and data, for example, composite image data for embodying the picture postcard system as a job file for each case. When job files for several cases are arranged as one lot, it is preferable that the memory 42 stores several lots of job files. When the CPU 40 executes the aforesaid various controls and management, it refers to the memory 42 and in particular the job files in it. It is also possible that at least a portion of the data is stored in the memory device 20 and the CPU 40 refers to the memory device 20 when it executes control.

The controller 14 is fundamentally arranged as described above.

The digital composite image data having the characters and the image synthesized by the controller 14 is output to the printer 16 as described above.

Figure 3:
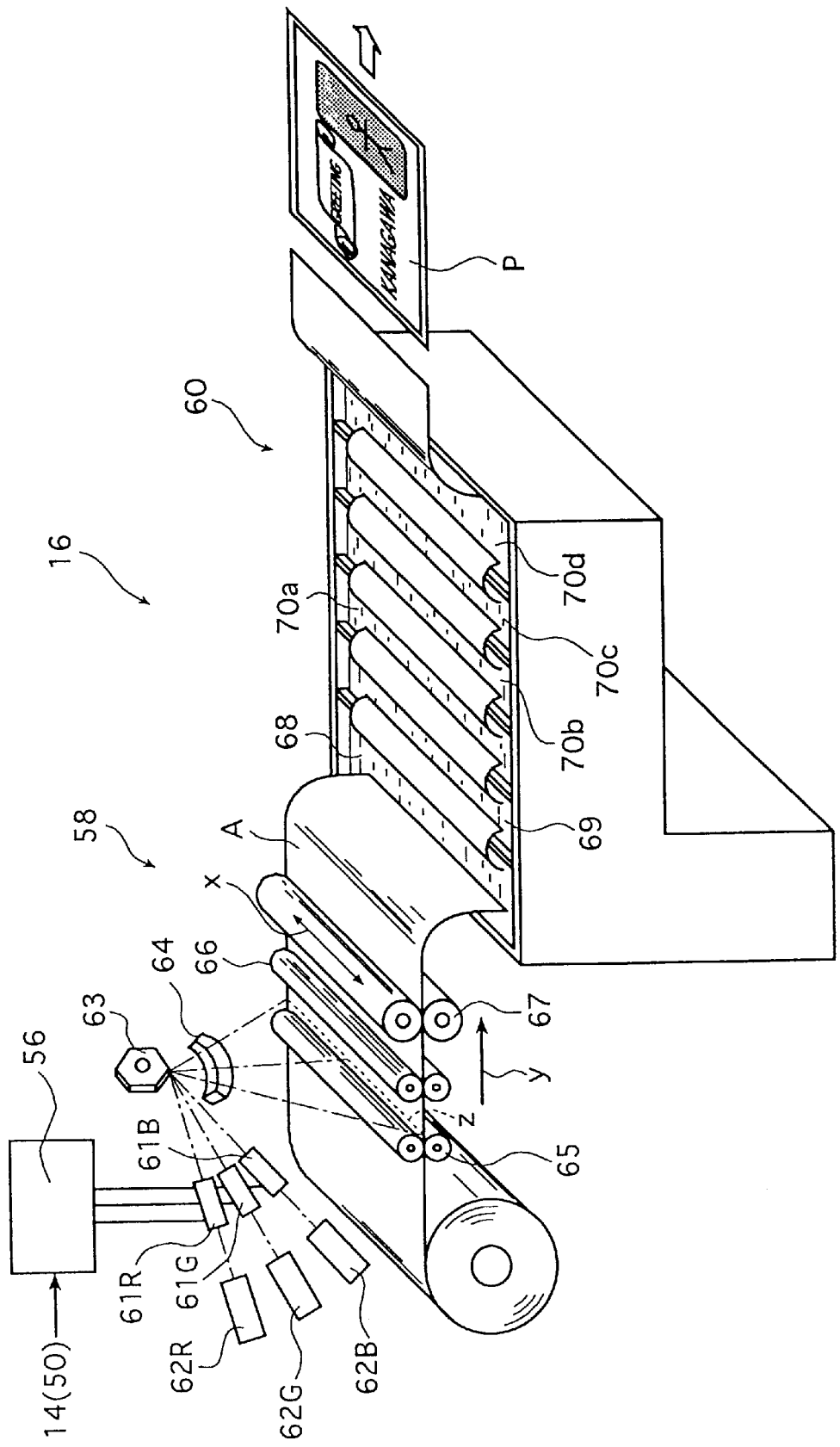
FIG. 3 is a schematic sectional view of an embodiment of an image output device of the digital print system shown in FIG. 1.

FIG. 3 shows a schematic view of an embodiment the printer 16.

As shown in FIG. 3, the printer 16 outputs the print P carrying a reproduced image by exposing an image to a photosensitive material based on the digital composite image data signal synthesized by the controller 14 in accordance with the print conditions registered to the job file and developing the photosensitive material. The printer 16 includes an exposure controller 56, an image exposing unit 58 and a developing unit 60.

The exposure controller 56 receives the composite image data output from the controller 14, converts the composite image data into image data (device-dependent image data) having a resolution (pixel density) and a mode in accordance with the image reproducing system of the printer 16, for example, into a digital RGB image data signal, converts the resultant digital RGB image data signal into an analog RGB image data signal and drives the acousto-optic modulators (AOM) 61R, 61G, 61B of the image exposing unit 58 so that a light beam is modulated in accordance with the analog RGB image data signal.

The image exposing unit 58 scan exposes the photosensitive material A with a light beam and records the image of the above image data onto the photosensitive material A. The exposing unit 58 includes a light source 62R for emitting a light beam corresponding to the exposure of the R photosensitive layer of the photosensitive material A, a light source 62G corresponding to the exposure of the G photosensitive layer thereof, a light source 62B corresponding to the exposure of the B photosensitive layer thereof, the AOMs 61R, 61G and 61B for modulating the light beams emitted from the respective light sources in accordance with a recording image, respectively, a polygon mirror 63 as an optical deflector, an fθ lens 64 and a sub-scan/feed device of the photosensitive material A.

The light beams emitted from the light sources 62R, 62G, 62B and traveling at a different angle each other enter the AOM 61R, 61G, 61B which correspond to them.

The exposure controller 56 transfers R, G, B drive signals to the AOM 61R, 61G, 61B in accordance with the recording image, namely, the image data supplied from the controller 14, and the AOM 61R, 61G, 61B modulate the incident light beams in accordance with the recording image.

The respective light beams modulated by the AOM 61R, 61G, 61B enter a substantially similar point of the polygon mirror 63 is reflected from the point. The resultant light beams are deflected in a main-scan direction (in the direction of an arrow x in the drawing) and adjusted by the fθ lens 64 so that they are imaged at a specific scan position z in a predetermined beam shape and enter the photosensitive material A. A light beam shaping unit and a surface inclination correcting optical system may be provided with the exposing unit 58, when necessary.

The photosensitive material A has an elongated size and loaded to a specific position in a state that it is wound to a roll shape and accommodated in a magazine.

The photosensitive material A is pulled out by pull-out rollers (not shown) and fed in a sub-scan direction perpendicular to the main-scan direction (the direction of an arrow y in the drawing) by a pair of feed rollers 65, 66 which are disposed across the scan position z and constitute a sub-scan unit while held at the scan position z.

Since the light beams are deflected in the main-scan direction, the entire surface of the photosensitive material A which is being fed in the sub-scan direction is scan exposed two-dimensionally by the light beams so that the image (latent image) of the image data transferred from the controller 14 is recorded on the photosensitive material A.

The photosensitive material A having been exposed is fed to the developing unit 60 by a pair of feed rollers 67, subjected to development processing and made to the print P on which the composite image is reproduced.

When the photosensitive material A is, for example, a silver halide photographic material, the developing unit 60 is composed of a color developing vessel 68, a bleach-fix vessel 69, washing vessels 70a, 70b, 70c and 70d, a drier unit and the like. The photosensitive material A is subjected to respective steps of predetermined processing in the respective processing vessels and dried and thereafter output as the print P in a rolled state. The print P may be output after it is cut to a predetermined length corresponding to a sheet of the print by a cutter.

The printer 16 is fundamentally arranged as described above.

As shown in FIG. 1 or FIG. 2, the monitor 18 displays the original image which was read by the scanner 12 in the prescan and subjected to image processing by the controller 14 and a composite image in which the read image, a background image and a character image are synthesized by the controller 14. In addition, the monitor 18 displays a region of an image reproduced by the printer 16 (finished print region) and an image frame of the background image in which the read image is inserted and synthesized as a reference line. It is preferable that the monitor 18 not only displays a prescanned image but also can successively read and display the images of a customer's film in monochrome as the video mode. It is also preferable that the operator can adjust and correct an image in the finished print region and an image window in the composite image, in particular, a position of a read image of the customer in the image frame shown by the reference line, the range of the image (magnification) and the like in the vide mode while observing the monitor 18, although this may be carried out in the prescan. Usually, in the present invention, when the operator instructs the controller 14 to adjust and correct a composite image in any of a prescan mode and a main-scan mode, operation is automatically switched to the video mode once and the prescan and the main-scan can be carried out each three times again after the completion of the adjustment and correction.

The memory device 20 is used to store a predetermined number of composite image data as shown in FIG. 1 and FIG. 2. Since the memory device 20 may be used as auxiliary memories and backup memories such as the data memory 42, frame memory 46, background image memory 54 and the like in the controller 14, it may be composed of a server, HD, removable HD or the like or a magnetic recording medium such as an MO (magneto-optical recording medium), magnetic tape, FD or the like and the driver thereof. The memory device 20 stores the respective digital composite signals of a background image (template file) in accordance with the object of a previously prepared picture postcard, a predetermined sentence to be synthesized with the background image, the bitmap-created character images of the input address, name, arbitrarily-created sentence and the like of the customer and an original image read by the image input device 12 before they are subjected to composite processing, a digital composite image signal processed by the controller 14 or used by the printer 16 and further a portion or the whole of the composite processing conditions, image processing conditions and exposure conditions of a digital image and the processing conditions of a photosensitive material. Otherwise, digital composite images for several cases and the respective processing conditions therefor, for example, printing conditions, bonding conditions and the like are integrated in a job file as one lot and the memory device 20 stores several lots of the job files. The memory device 20 may be used in place of the various memories in the controller 14.

The bonding machine 24 automatically bonds the character/image composite print P output from the printer 16 on the base sheet CRD such as the New Year's card, the standard postal card or the like whose top and bottom are predetermined in accordance with a job file and makes a so-called picture postcard PC composed of the base sheet in which the characters, the background image and the customer's photographic image are arranged as normal image with respect to the top side of the front and the back of the postal card as the base sheet. When the print P output from the printer 16 is wound around a roll, it is preferable to cut off the print P one by one before it is bonded.

The print system 10 used in the present invention is fundamentally arranged as described above. The image synthesizing method of the present invention embodied by the digital print system 10 will be described below in detail.

Figure 4:
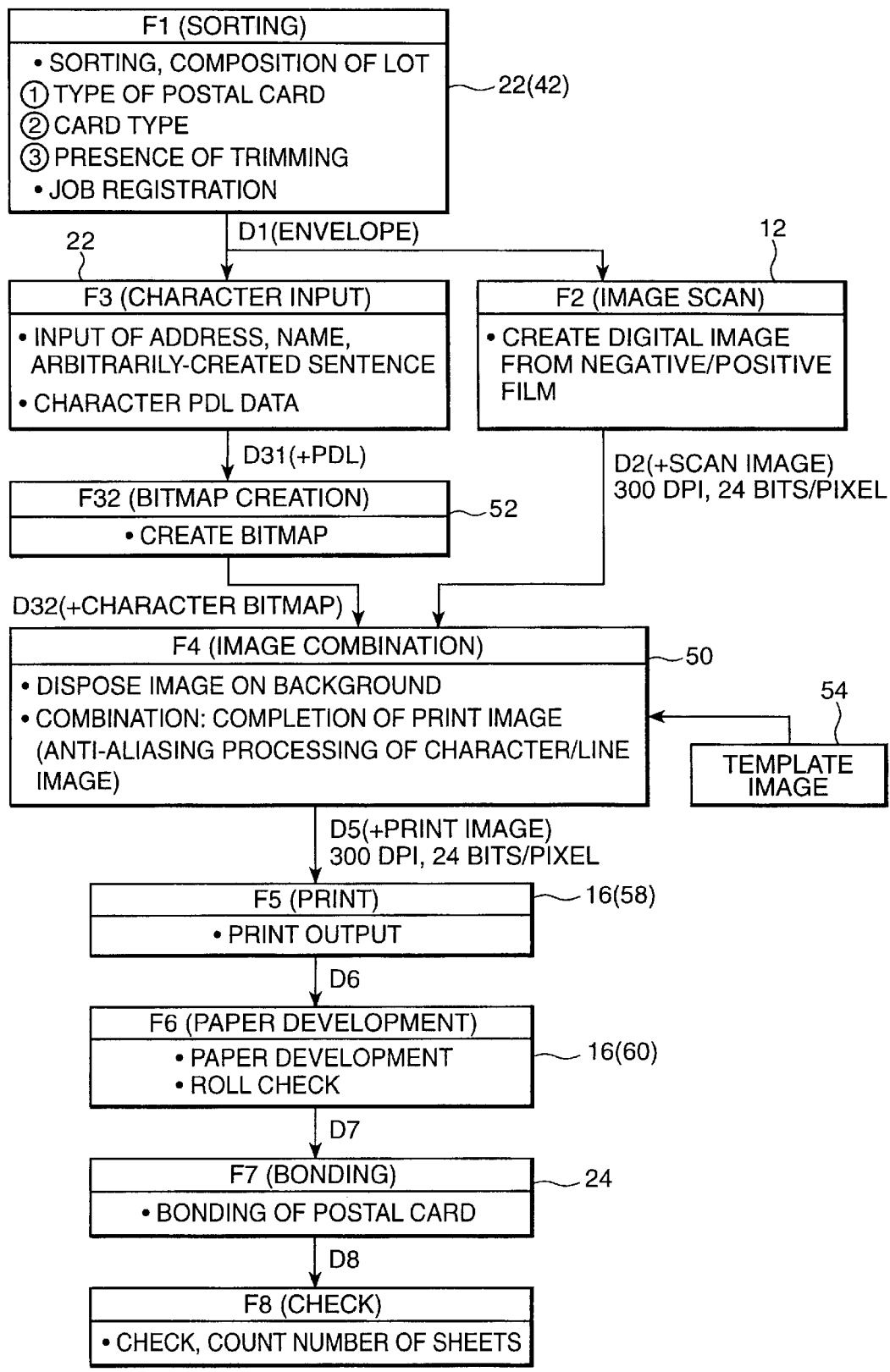
FIG. 4 is a flowchart of an embodiment of a picture postcard system to which the image synthesizing method of the present invention is applied.

FIG. 4 is a flowchart showing an embodiment of a flow of a picture postcard creating system (hereinafter, referred to as a picture postcard system) in the digital print system 10 to which the image synthesizing method of the present invention is applied. The flowchart of the picture postcard system in FIG. 4 shows a flow for creating a postal card having a composite print image, namely, a so-called picture postcard in which a composite image is bonded on a base sheet such as a postal card or the like in the digital print system 10 to which the method of the present invention is applied.

In the flow of the picture postcard system shown in FIG. 4, first, a sorting process (F1) is carried out to apply orders from customers to the picture postcard system. In the sorting process, first, ① a type of postal cards serving as a base sheet, ② a type of picture postcards showing a selected background (template) image, ③ a type of films and whether trimming is necessary or not from the information contained in the order sheets of the customers. An order for one type of a picture postcard is handled as one case and one lot is composed of for example, about 20 cases. The respective steps of processing shown in FIG. 4 are performed using the one lot as a processing unit.

Next, the data input device 22 reads the data stored in the memory device 20, creates a job file in the memory 42 and registers a job by displaying the job file on the monitor 18. In the picture postcard system, the content of the processing executed by the image scan process of F2 shown in FIG. 4 to the content of the processing executed by the bonding process of F7 shown in the figure are registered to the job file for every cases of one lot in the job registration processing. For example, the operator inputs such items of each case as a lot No. case No. handling direction (lengthwise or crosswise), order symbol (type of a template), type of a postal card, number of order, type of a user film, frame No., print magnification and the like or designates them on a job registering screen (register section) of the monitor 18 for creating the job file.

The job file includes a print section ([print] section, refer to Table 2 to be described later) for storing print conditions, a scan section ([SCANn] section, refer to Table 3 to be described later), a character section ([CHARn] section, refer to Table 4 to be described later), and the like, in addition to a job section ([JOB] section, refer to Table 1 to be described later) for storing these items, namely, information commonly required in the picture postcard system of the digital print system 10.

In the present invention, a position and a size of a read image (hereinafter, referred to as a scanned image) on a template image are previously designated for each scanned image, the read image being defined in the template attribute file (refer to Table 5 to be described later) of the background image memory 54 in accordance with a template image designated by an order number in the job file. As a result, respective scan images are read by the scanner 12 in response to the designation from the customer's original in accordance with a designated size at the subsequent image scan process F2. The respective scan images having been read are converted into image data having an output resolution of a designated size, for example, 300 dpi and then can be automatically synthesized at a designated position on the template image by the composite processing unit 50 in a subsequent image synthesizing process F4. It is needless to say that the template image is image data having the same output resolution (300 dpi) likewise.

When the order symbol (card type and card PL) is designated and registered to the job section of the job file in the job registration section displayed on the monitor 18, template image data and its attribute information are read from the template attribute file of the background image memory 54 in accordance with the registered order symbol, transferred to the respective sections of the job file, namely, to a job section, a print section, a scan section, a character section and the like and registered therein. In addition, other information to be registered to the job file is designated and registered in the job registration section.

A job file is registered for each case as described above. It is also possible to display a job file having been registered as a list, to display the content of the job file of each case, to the change a content of the job file and to delete characters and image data relating to the change.

When the jobs of all the cases for one lot are registered as described above, the sorting process F1 is finished. Thereafter, the image scan process F2 is executed by the scanner 12 and a user's character input process F3 is executed by the data input device 22 for the respective cases of the lot in accordance with the registered job file.

First, in the image scan process F2, scan images as many as those registered in the job file are read by the scanner 12 from a negative film or a positive film of the user or from a reflected original in accordance with the job file and a reading size designated by the template attribute file and stored once in the frame memory 46 of the image processing device 15 of the controller 14. Then, the respective scanned images are read from the frame memory 46, subjected to predetermined image processing in the image disposal processing device 48 and converted into image data having the designated size and the output resolution (300 dpi).

Whereas, in the user character input process F3, pieces of character data as many as those registered such as the addresses, names, arbitrarily-created sentences and the like of the customers are input by the operator using the data input device 22 such as the keyboard 22a or the like and described as a PLD (page description language) and thereafter bitmap-created in the character data creating device 52 of the image processing device 15 and converted into character bitmap data having the output resolution (300 dpi). The bitmap-created character images as many as those registered to the job file are created as described above.

In an image synthesizing process F4, all the scanned images and all the character images which were obtained as described above and the template image registered to the job file and read from the background image memory 54 are synthesized by the composite processing unit 50 of the image processing device 15 in accordance with the job file.

Figure 5:
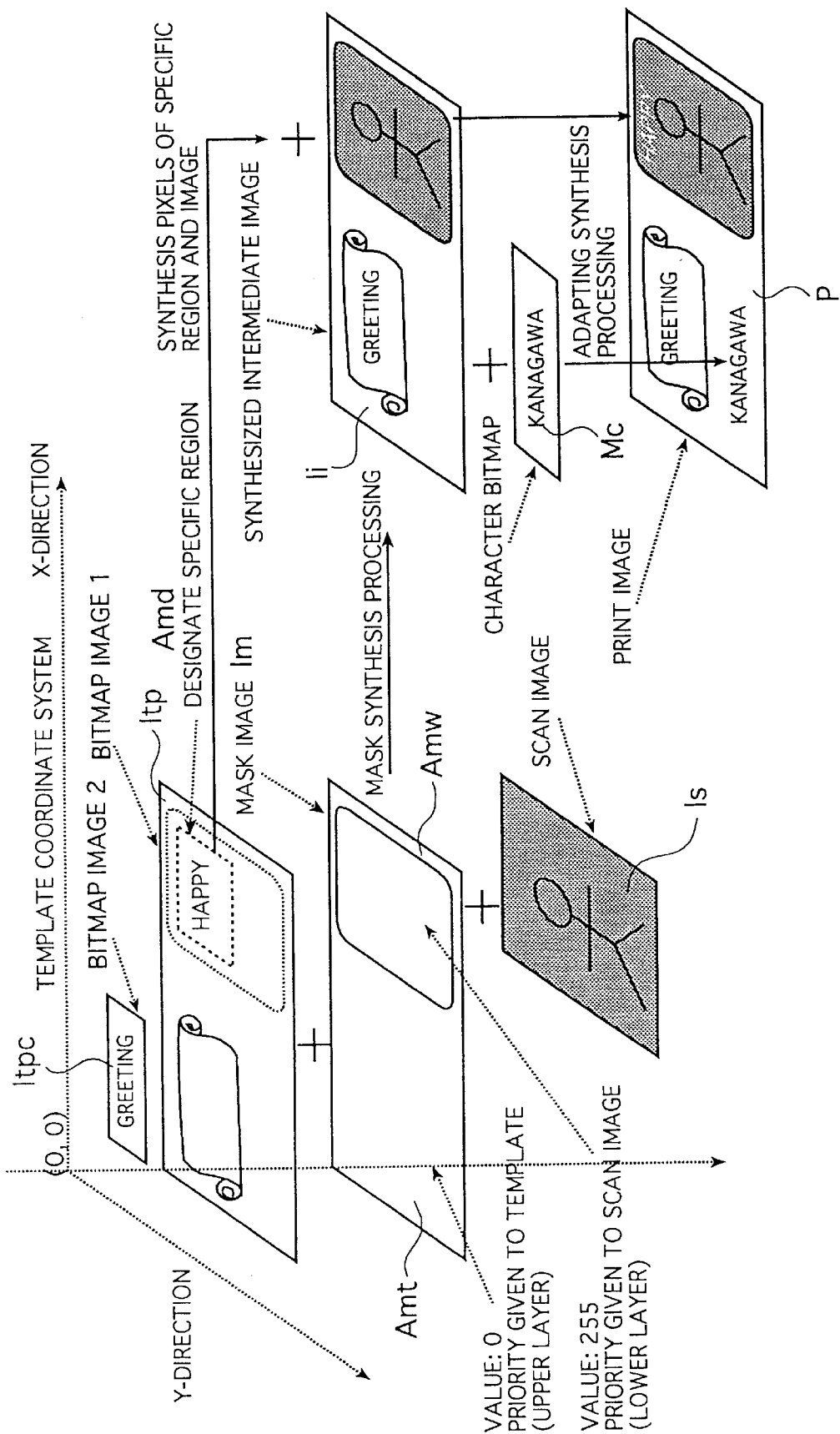
FIG. 5 is a view describing a flow of an embodiment of an image composite process executed in the method of the present invention.

FIG. 5 shows a flowchart of an example of the image synthesizing process F4 which is executed in the composite processing unit 50 of the controller 14.

As shown in FIG. 5, a template image (bitmap image 1) Itp selected by the customer, a predetermined number of predetermined assembly images (bitmap images 2) Itpc and mask images Im are read from the background image memory 54 to the composite processing unit 50 as to the three primary colors, for example, as to each of R, G, B in accordance with the designation of them to the job file performed by the user (input through the keyboard 22a or the mouse 22b). A predetermined number of scanned images Is having the designated size which were obtained in the image scan process F2 in accordance with the job file are input from the image disposal processing device 48 to the composite processing unit 50 as to each of R, G, B. Further, a predetermined number of bitmap-created character images Mc (M1c) which were obtained in the user character input process F3 in accordance with the job file are input from the character data creating device 52 to the composite processing unit 50 as to each of R, G, B.

Although only image data of one color of the above RGB image data, that is, only G image data, for example, is shown in FIG. 5, it is needless to say that the remaining two R,B colors can be shown likewise.

The template image Itp is the bitmap image 1 which is disposed to an upper layer in a template coordinate system in which combination is executed. The template image Itp has a picture and predetermined characters (sentence) corresponding to a purpose of the picture postcard PC or a New Year's card in the illustrated example, that is, characters "Happy" and the like assembled to it, a size as large as the base sheet such as the postal card (CRD) and a resolution similar to the output resolution of the printer 16. Further, the bitmap image Itpc of several types of pictures and predetermined characters (sentence), that is, characters such as "Greeting" in the illustrated example can be assembled to the inside and the outside of the picture of the template image Itp.

In the template image Itp, the character image, picture (including a mark, etc.) and the like are formed in the non-scan image region Amt externally of a scan image region Amw (which corresponds to the image window of a mask image Im to be described later) in which the scan image Is is synthesized and which is occupied by it. When the character image is synthesized on the scan image Is, the region of the character image which is synthesized in the scan image region Amw can be designated as a specific region Amd and a predetermined assembly image such as characters and the like can be formed in the designated specific region Amd as the template image Itp.

Next, the mask image Im is disposed to a medium layer in the template coordinate system and masks image data (read image data which is output from the image disposal processing device 48) other than the image window Imw to which the scan image Is is assembled. When each color of the image data is represented by 8-bit data (a full color of a total of 24 bits) in the illustrated example, the mask image Im has a mask value set to 255 for any image of R, G, B in the image window Amw and priority is given to the scan image Is disposed to a lower layer, whereas the mask value is set to 0 for any of R, G, B images in the non-scan image region Amt externally of the image window Amw and priority is given to the template image Itp disposed to the higher layer.

The scan image Is is disposed to the lower layer in the template coordinate system and is an image which the customer desires to synthesize or an image in a portion of the region of the image and is read so that it coincides with the position and the size of the image window Amw which is synthesized with the template image Itp. Even if there is a read image other than the image window Amw, it is not synthesized and reproduced to the picture postcard PC.

A number of the scan image Is which will be synthesized with the template image Itp may be one, two or more and the scan images Is as many as those registered to the job file in accordance with the template images Itp and specifically in accordance with the number of the image windows thereof are read. A shape of the scan image Is is not limited to the rectangular shape of the film original and the like as the customer's image and may be a square shape, diamond shape, circular shape, elliptic shape or heart shape or may be any other arbitrary shape. Further, the shape may be also optionally designated by the image window Amw of the mask image Im, namely, a mask shape. In this case, the customer's image must be read so that it has a region larger than the image window Amw of the mask image Im and synthesized in the image window Amw using a desired region of the customer's image, that is, a region of a main subject as the scan image Is.

A bitmap character image Mc is obtained by bitmap-creating vector font characters such as the address, name and other arbitrarily-created sentences of the customer. Since the printer 16 has a low resolution, it is preferable that the bitmap character image Mc is subjected to anti-aliasing processing by the character/image data creating unit 52 and further adjusted to a color of a background image. A number of the bitmap character images Mc synthesized on the template image Itp (otherwise, on the scan image Is) is not particularly limited and any number of them may be synthesized. The respective bitmap character images Mc are synthesized at positions which are registered on the template image Itp in a size registered to the job file.

It is needless to sat that the template image (including the predetermined assembly image Itpc), the mask image Im, the scan image Is and the bitmap-created character image Mc are bitmap image data having a resolution (for example, 300 dpi) similar to the output resolution of the printer 16.

As shown in FIG. 5, when the predetermined assembly image (the bitmap image 2) Itpc as described above is prepared for combination and the template image (the bitmap image 1) Itp which has the predetermined image prepared in the designated specific region Amd and the mask image Im which has the image window Amw of the scan image Is are prepared, respectively for each of the three colors R, G, B, masking is effected as to respective colors by clamping the mask image Im as an medium layer between the template image Itp as a highest layer and the scan image Is as a lowest layer. Then, an intermediate layer Ii is created by subjecting the template image Itp and the scan image Is including the predetermined assembly image Itpc to mask combination processing.

At the time, the scan image Is is read in an inserting size on the template image Itp recorded to the template attribute file of the job file, for example, in a size in the main-scan direction and a size in the sub-scan direction. The scan image Is is automatically synthesized in the above size at the inserting position on the template image Itp registered to the template attribute file using, for example, a coordinate located in the main-scan direction and the sub-scan direction from the upper left corner as a start position, after it is automatically turned, when necessary so that the top directions of respective images coincide with each other and the respective images are arranged as normal images.

When it is assumed that the R, G, B image data used here are composed of 8 bits (0–255), respectively, a mask value of the respective pixels of the mask image Im is also represented by 8 bits or 0–255. It is assumed here that image data 0 represents a maximum density (a maximum amount of exposure) and image data 255 ($2^8$–1) represents a minimum density (a minimum amount of exposure).

When a mask value of the mask image Im is represented by A, pixel values (template data) of the three colors (R, G, B) of the template image Itp at the highest layer are represented by Br, Bg, Bb and pixel values (scan image data) of the three colors (R, G, B) of the scan image Is at the lowest layer are represented by Cr, Cg, Cb, image data IR, IG, IB of the three colors of the intermediate image Ii perspectively synthesized using the pixel values of the template image Itp and the pixel values of the scan image Im can be determined from the following formulas.

$$IR=(Cr-Br)\times A/255+Br$$

$$IG=(Cg-Bg)\times A/255+Bg$$

$$IB=(Cb-Bb)\times A/255+Bb$$

The bitmap-created character image Mc which was previously subjected to anti-aliasing processing, for example, "Kanagawa Prefecture" in an illustrated example is automatically adapted and synthesized with the thus obtained intermediate image Ii (IR, IG, IB) in a size registered at a position on the template image Itp (thus, the intermediate image Ii) registered to the template attribute file of the job file as well as a predetermined image in the specific region Amd, for example, a character image of "Happy" in the illustrated example is synthesized with the scan image Is to thereby obtain three-color image data of a print image Ip in which necessary characters and images are synthesized. At the time, the character image Mc is synthesized with the intermediate image Ii (template image Itp+scan image Is) after it is automatically turned so that the top directions of them registered to the job file coincide with each other and they are arranged as normal images.

The print image P in which the template image Itp, the scan image Is and the character image Mc are synthesized with each other can be obtained as described above. The composite print image P is displayed on the monitor 18 together with the frame (reference line) of the image window Amw in which the scan image Is is synthesized in the prescan or in the video mode in which the images of the user's film are successively read in monochrome and displayed on the monitor 18, as described later. The visual observation of the respective images on a display screen of the monitor 18, in particular, the visual observation of the scan image Is in the frame line of the image window Amw permits; to confirm the character image Mc and the scan image Is themselves and the position, top and bottom and direction thereof; to manually adjust and, in particular, fine adjust the top and bottom, direction, disposition and size of the scan images Is by physically moving and turning the customer's film in the carrier 32 of the image input device 12 in which it is loaded or physically moving and turning the customer's film together with the carrier 32 or enlarging or reducing the scan images Is by zooming or the like of the imaging lens unit 34 in the prescan or the video mode (monitor 18); or to electronically adjust and, in particular, fine adjust the top and bottom, direction, disposition and size of the scan image Is in the image processing device 15 (in particular, in the image disposal processing device 48) of the controller 14 by the data input device 22 such as the keyboard 22a, mouse 22b or the like. It is preferable to adjust the scan image Is by turning it in a unit of 90° or in a unit of an arbitrary angle θ. It is also preferable to fine adjust the position and size of the image in a unit of a specific length, for example, one millimeter or in a unit of one pixel.

Since an optical magnification and electronic magnification of input/output images (the image read by the image input device 12 and the scan image in the image frame (reference line) on the print image) are determined taking the pixel defect caused by the image processing and the like into consideration in the present, the vignetting of the scan image Is in a composite image, that is, a partial image defect of a main subject and the like such as a person, face and the like can be prevented. It is preferable to display the image frame (reference line) and the scan image Is in the frame in enlargement to easily confirm the vignetting (pixel defect) of the scan image Is, in particular, the main subject and the like in a composite image. The vignetting of the scan image Is in the composite image can be more reliably prevented by the above arrangement.

In the above embodiment, the operator manually adjusts the top and bottom, direction, position (disposition), size and the like of the scan image Is by visually confirming the composite image, in particular, the image frame (reference line) and the scan image Is in the image frame displayed on the monitor 18. However, the present invention is not limited thereto and it is also possible to automatically determine a position and size of the main subject and, when the main subject is, for example, the face of a person, a position and size of the face in the image processing device 15, in particular, in the composite processing unit 50, to determine whether the thus discriminated main subject is accommodated in the image frame of the image window Amw in the template image Itp, to automatically synthesize the main subject when it is accommodated therein, whereas when the main subject is not accommodated in the image frame, to automatically synthesize the scan image Is after it is accommodated in the image frame by the automatic adjustment of the position and size (magnification) thereof which is performed electronically, physically or optically (through the scanner 12). When the main subject cannot be accommodated in the image frame by the automatic adjustment, an alarm may be displayed on the monitor 18 or an alarm sound may be generated. It is preferable to display the composite image on the monitor 18 after the completion of the automatic combination to permit the operator to confirm the result of the automatic combination.

A method of automatically confirming a main subject from an original image is shown in a method of recognizing a face size disclosed in Japanese Patent Application Laid-Open No. 2-287531 filed by the applicant and a method of extracting the face data of a person disclosed in Japanese Patent Application Laid-Open Nos. 4-346332, 4-346334 and 6-186652 filed by the applicant and the like. The main subject can be automatically enlarged and reduced by means of the former face size recognizing method and a position of the main subject can be adjusted by the latter face data extracting method.

When it is desired to use the entire image of the customer's original as much as possible as the scan image Is to be synthesized, it is preferable that the image input device 12 reads the entire image of the customer's original by projecting it through the imaging lens unit 34 so that the entire image is inscribed (or nearly inscribed) in the effective region of the CCD sensor 36 and the image processing device 15 of the controller 14 cuts out image data, which is located in a region inscribed in the image window Amw which coincides with or is similar to a size designated by the template attribute file, from the region of the read entire original image as the scan image Is, inserts the scan image Is into the image window Amw of the template image Itp and synthesizes it.

Whereas, when it is desired to use only a specific designated region of the image of the customer's original as the scan image Is to be synthesized, it is preferable that an optical magnification is made as large as possible through the imaging lens unit 34, the image input device 12 reads the image by projecting it so that a region including the designated region as much as possible is inscribed in the effective region of the CCD sensor 36 and the image processing device 15 of the controller 14 cuts out image data in a region inscribed in the image window Amw which is similar to the size designated by the template attribute file as the scan image Is from the thus read designated region of the original image, inserts the scan image Is into the image window Amw of the template image Itp and synthesizes it. Otherwise, it is also preferable that the image input device 12 reads the entire image of the customer's original as much as possible as described above and the image processing device 15 of the controller 14 cuts out minimum image data which includes the specific designated region and is located in the region inscribed in the image window Amw similar to the size designated by the template attribute file as the scan image Is, inserts the scan image Is into the image window Amw of the template image Itp after the image data is electronically magnified by setting an electronic magnification to a value as large as possible and synthesizes it.

Figure 6:
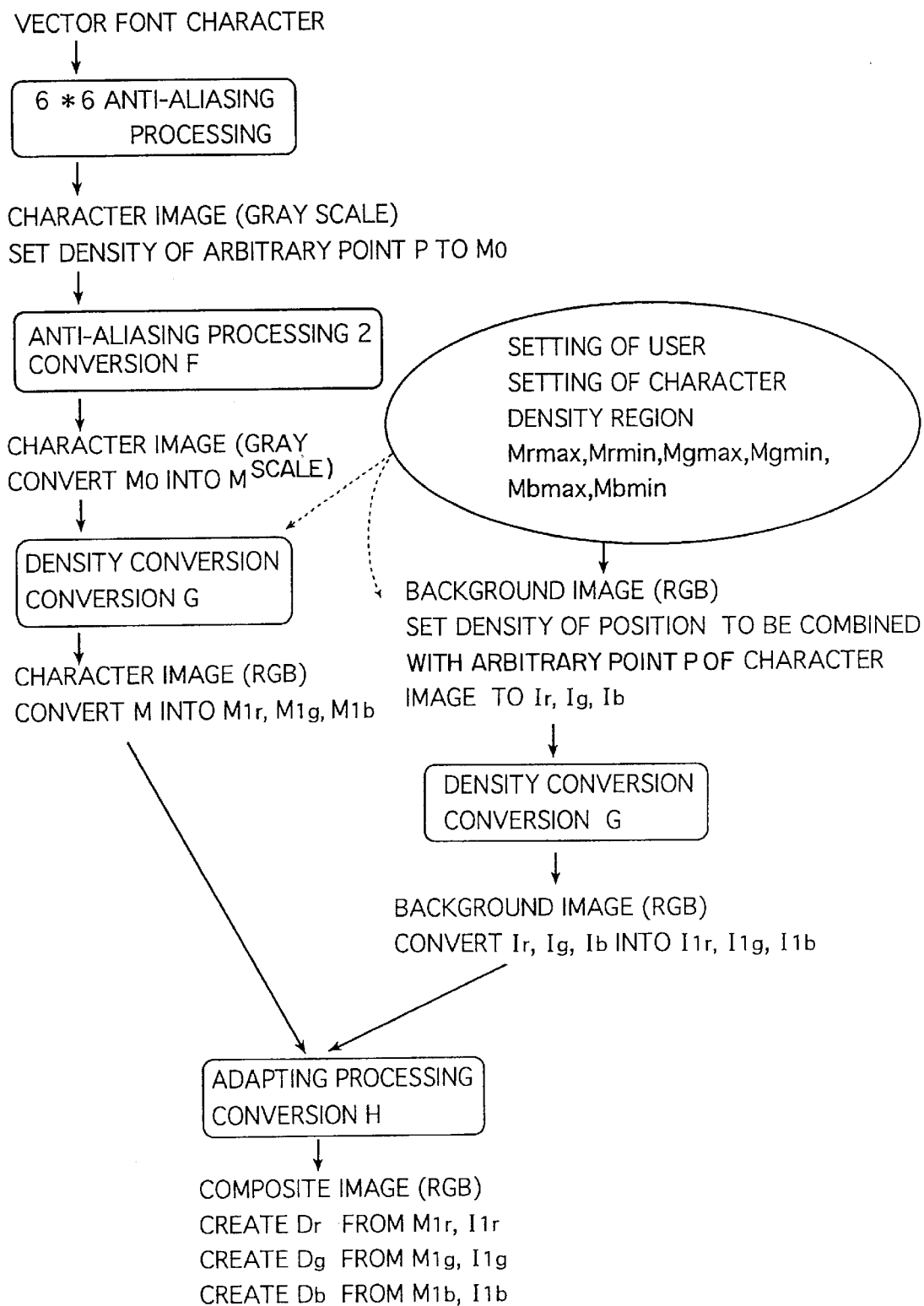
FIG. 6 is a view describing a flow of an embodiment of a character disposal process from character creation to combination of characters and an image in the image composite process shown in FIG. 5.

Next, a flow of an embodiment of a character disposal process up to a process for synthesizing the character image Mic with the intermediate image Ii which is performed by the character image data creating device 52 and the composite processing unit 50 will be described. FIG. 6 shows a case that characters and line drawings are composed of a black character and FIG. 7 shows a case that they are composed of a voided character.

Figure 7:
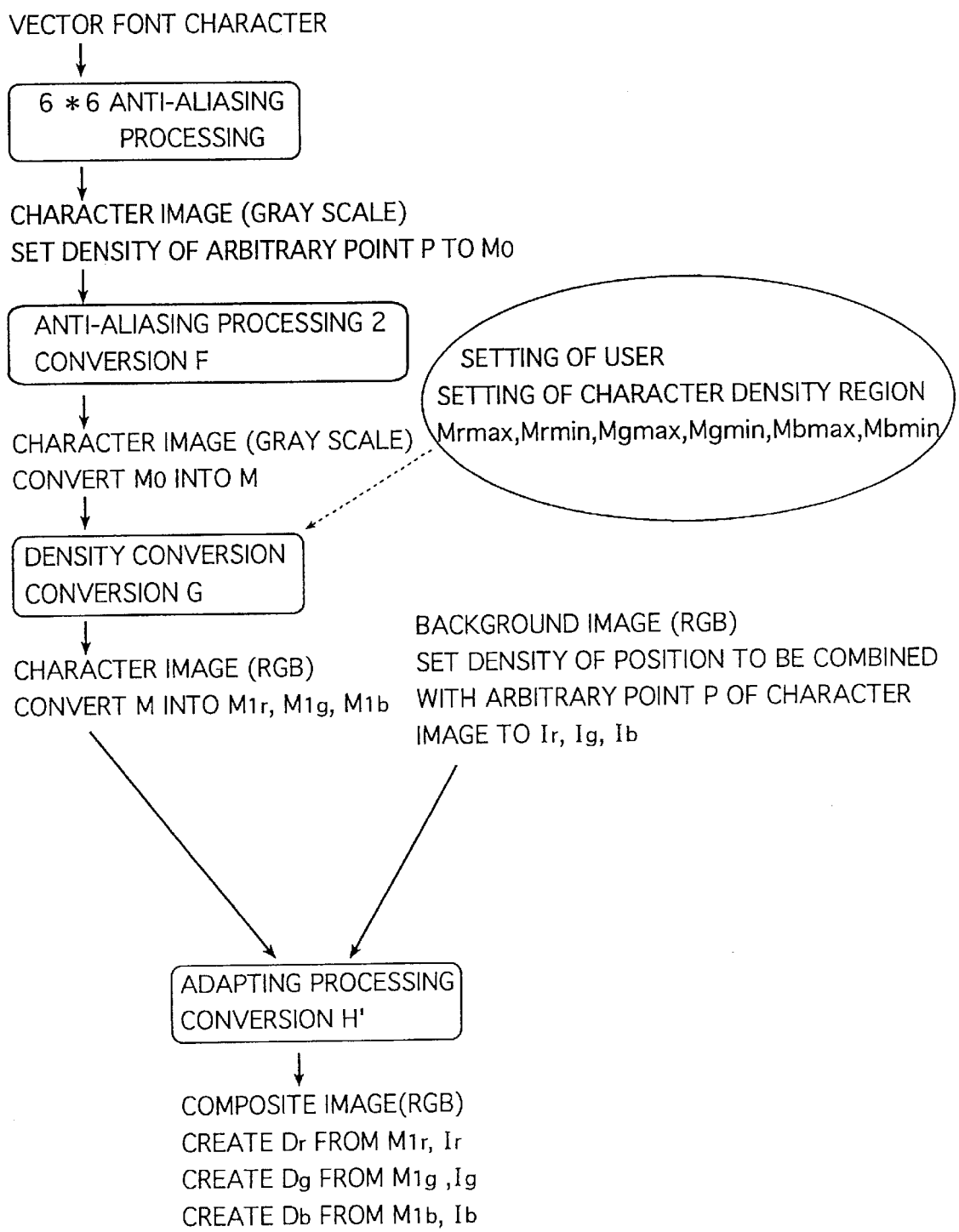
FIG. 7 is a view describing a flow of another embodiment of the character disposal process from the character creation to the combination of the characters and the image in the image composite process shown in FIG. 5.

First, a vector font letter is subjected to anti-aliasing processing as shown in FIG. 6 in case of the black letter and as shown in FIG. 7 in case of the voided letter.

The anti-aliasing processing is applied to smoothly change the density of the outer periphery of a letter, that is, the density of the boundary region between the letter and a background image when the printer 16 has a low resolution of, for example, 300 dpi in order to make the letter to a natural letter in the print image P by eliminating jaggy (irregularity) from the border of letter which would be conspicuous when output as it is.

When the vector font letter is to be bitmap created by the anti-aliasing processing, pixels having an intermediate density can be obtained in the boundary region of a letter, that is, a gray scale image can be obtained by creating, for example, a 8-bit image (gradation: 8 bits/pixel) using a number of pixels n times a target (output) resolution and averaging the image by n×n pixels. As described above, a bitmap letter image (gray scale) can be obtained by applying, n×n, for example, 6×6 anti-aliasing processing to the letter.

Next, as shown in FIG. 6 and FIG. 7, anti-aliasing processing 2 is further applied to the thus obtained bitmap letter image (gray scale) subjected to the n×n, for example, 6×6 anti-aliasing processing. The anti-aliasing processing 2 is executed to adjust an apparent thickness (which is apparently recognized by human eyes) of a letter of the gray scale letter image subjected to the n×n anti-aliasing processing. For example, when the change of the intermediate density of the outer periphery of the letter image in the boundary region is increased on the outside of the letter image, that is, when the value of the pixels of the intermediate density is made nearer to the density of the letter (for example, image data 0 is in the black letter), the jaggy which was made invisible in the n×n anti-aliasing processing appears again. On the contrary, when the change of the intermediate density is increased on the inside of the letter image, that is, when the value of the pixels of the intermediate density is made nearer to the density of the background image (for example, image data is 255 in a black letter surrounded by a white background), the letter is made thin. Thus, it is preferable to adjust the appearance of a letter by adjusting the thickness and border of a letter image by the anti-aliasing processing 2. The anti-aliasing processing 2 will be referred to as conversion F.

Figure 8:
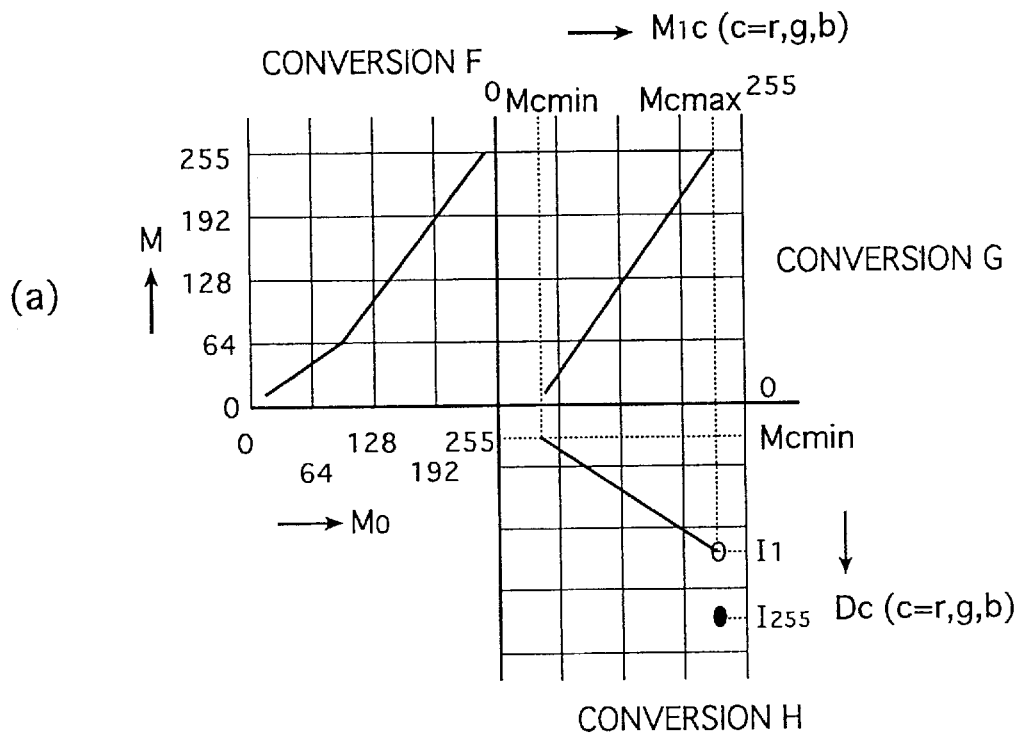
FIGS. 8($a$) and ($b$) are graphs showing examples of conversion functions in the respective conversion processes in the character disposal process shown in FIG. 6 and FIG. 7, respectively.
Figure 8:
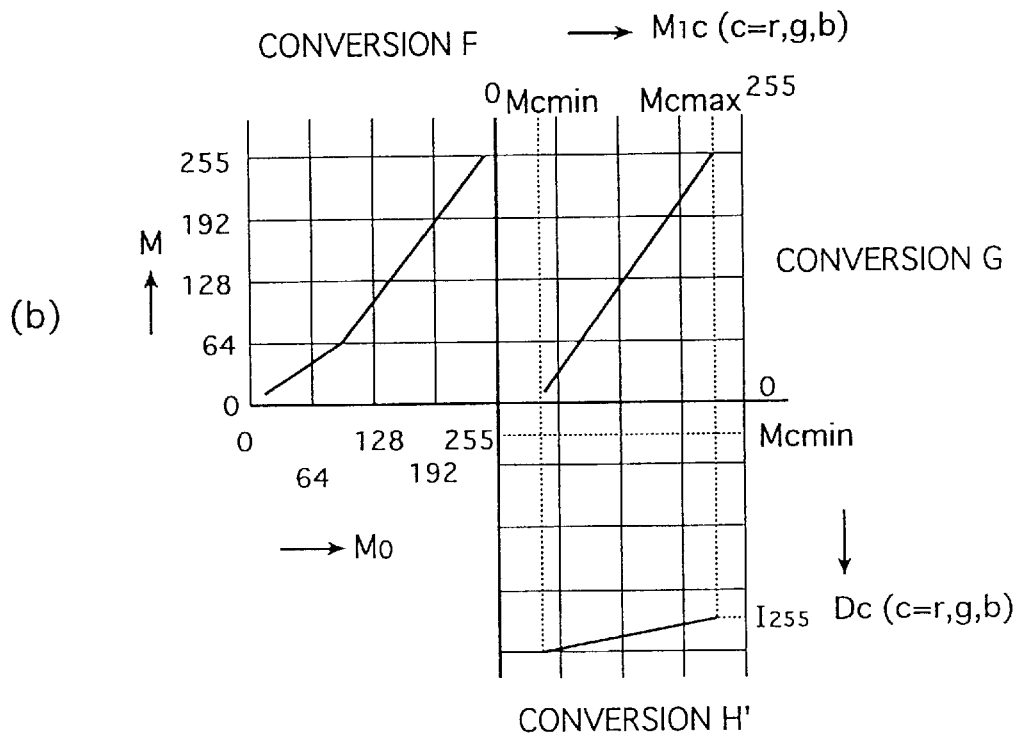

When a density ($M_{0ij}$) at an arbitrary point $P_0$ of the gray scale letter image subjected to the n×n anti-aliasing processing is represented by $M_0$, a density M at the arbitrary point $P_0$ of the gray scale letter image subjected to the conversion F can be determined by, for example, the upper left graphs of FIG. 8(a) (in case of a black letter) and FIG. 8(b) (in case of a voided letter), respectively (both of the graphs are the same). It is preferable that the conversion F is made using a look-up table (LUT) having 256 steps from 0 to 255 which represents a function formula in place of it.

As shown in FIG. 6 and FIG. 7, the density M at the arbitrary point (pixel) $P_0$ of the gray scale letter image in which the thickness of the letter was adjusted by the conversion F as described above is subjected to density conversion to thereby obtain letter image data $M_1 r$, $M_1 g$, $M_1 b$ having three colors of R, G, B in which a gray balance is taken into consideration. The density conversion is referred to as a conversion G which is a process executed to normalize the density using an upper limit value Mcmax and/or a lower limit value Mcmin of letter image data. That is, the conversion G is a process for restricting a dynamic range of the letter image data.

When a letter image is written by a black letter, it suffices only to set the image data of it (Mr, Mg, Mb) to (0, 0, 0). In this case, however, the image data is saturated by the excessively strong light intensity of a laser beam for exposing it and loss of definition arises. Further, a tint is applied to the black letter depending upon a color of the background image with which the black letter is synthesized. When the tint is reddish, the appearance of the black letter is made unattractive and such a letter is disliked as described above. Since a bluish black letter, for example, is preferred to a reddish black letter, image data representing deep-black (Mrmin, Mgmin, Mbmin) can be set to (15, 10, 10) in the density conversion G to make the appearance of the black letter attractive. Although the lower limit value Mcmin is adjusted in case of the appearance of the tint of the black letter, it is preferable to adjust the upper limit value Mcmax in case of the appearance of the tint of the voided letter. As a result, although it is preferable in the present invention to adjust the lower limit value Mcmin in the black letter and the upper limit value Mcmax in the voided letter, it is more preferable to permit both the upper limit value Mcmax and the lower limit value Mcmin to be adjusted in any of the letters.

When the letter image is the black letter, the tint of the image data of the background image which is synthesized with the letter image also affects the appearance of the black letter. It is preferable to adjust the upper limit value Mcmax or the lower limit value Mcmin of the image data of the background image or both of them.

As described above, the user can set letter density regions of the respective colors R, G, B of letter image data and thus upper and lower limit values of the respective colors Mrmax, Mrmin, Mgmax, Mgmin, Mbmax, Mbmin in accordance with a tint (a color balance of the image data) of a background image in the density conversion G. In case of a black letter, the user can also set letter density regions of the respective colors R, G, B of background image data and thus upper and lower limit values of the respective colors Irmax, Irmin, Igmax, Igmin, Ibmax, Ibmin.

The conversion G can be represented by, for example, the upper right graphs of FIG. 8(a) (in case of a black letter) and FIG. 8(b) (in case of a voided letter), respectively (both of them are the same).

Next, the letter image (density: $M_1r$, $M_1g$, $M_1b$) obtained after the execution of the conversion G is synthesized with the background image (density in case of the black letter: $I_tr$, $I_tg$, $I_tb$, density in case of the voided letter: Ir, Ig, Ib) in a state as they are. Since the letter image is subjected to the anti-aliasing processing, when the background image is colored and, for example, when the background colored image has a relatively high density in case of the black letter or when it has a relatively low density in case of the voided letter, the intermediate density pixel portion of the outer periphery of the letter image subjected to the anti-aliasing processing is lifted up in a dot-like state from the background image depending upon a color of the background image and the letter image is not adapted to the background image. To cope with this problem, the present invention performs a process for adapting the intermediate density pixel portion of the outer periphery of the letter image subjected to the anti-aliasing processing to the background image and then synthesizing them as shown in FIG. 6 and FIG. 7. This process is referred to as an adapting/synthesizing process. A composite image (RGB) of the letter and the image can be obtained as described above.

In case of a black letter, when a process for subjecting a letter image (density: $M_1r$, $M_1g$, $M_1b$) having an adjusted color(letter) balance and a background image (density: $I_1r$, $I_1g$, $I_1b$) having an adjusted color balance to the adapting/synthesizing processing is referred to as conversion H, a composite image Dc (Dr, Dg, Db) which has been subjected to the adapting/synthesizing process can be obtained by the conversion H shown by, for example, the lower right graph of FIG. 8(a).

On the other hand, in case of a voided letter, when a process for subjecting a letter image (density: $M_1r$, $M_1g$, $M_1b$) having an adjusted color (letter) balance and a background image (density: Ir, Ig, Ib) to the adapting/synthesizing processing is referred to as conversion H', a composite image Dc (Dr, Dg, Db) which has been subjected to the adapting/synthesizing process can be obtained by the conversion H' shown by the lower right graph of FIG. 8(b).

As shown in FIG. 6 or FIG. 7, the letter image Mc created from the vector font letter can be synthesized with the background image Ic and the composite image Dc which has been subjected to the adapting/synthesizing process can be obtained in the way as described above.

A predetermined image in the specific region Amd, that is, the image of the letter "Happy" (pixels constituting the image) in this case is synthesized with the scan image Is in the composite intermediate image Ii. When the predetermined image in the specific region is a black letter or a voided letter which has been subjected to the aforesaid anti-aliasing processing, the predetermined image can be synthesized by the above method of synthesizing a letter and an image. However, when the predetermined image used to the combination is a logo-mark, illustration, non-anti-aliasing letter and the like, the predetermined letter is simply placed on a scan image as background. The simply-placing process will be described.

In the simply-placing process, when the RGB image data of the template image (bitmap image 1) Itp is, for example, (255, 255, 255), the scan image Is is employed for the pixels designated in the specific region Amd of the template coordinate system, whereas when the RGB data is other than (255, 255, 255), the template image (bitmap image 1) Itp is employed as it is. The predetermined image in the designated specific region Amd can be simply placed on the scan image Is and synthesized as described above.

As shown in FIG. 5, composite image data can be created by the composite processing unit 50 as described above. There can be obtained a print image P in which the bitmap letter image Mc or "Kanagawa Prefecture" in the illustrated example is adapted and synthesized in the region of the template image Itp of the composite intermediate image Ii and a predetermined image in the designated specific region Amd or letters "Happy" are simply assembled as voided letters from the composite image data. The composite image data obtained as described above is the image data of a composite print image arranged such that the appearance of a letter color is not affected by a tint of a background image with which the letters are synthesized, a scan image is exactly inserted into the image frame of the template image (background image) and synthesized and the template image without vignetting and the template image, scan image and letter image are synthesized with each other as normal images.

As described above, there can be obtained the image data in which the customer's image is exactly inserted into the region of the background image without being vignetted and the letters and the image are synthesized as the normal images. The composite processing unit 50 first executes the composite processing to the image data successively read from the customer's image by the scanner 12 in the video mode or to the scan image data in order to display the image data on the CRT monitor 18. Composite image data in which the video mode image data or the prescan image data, letters and a base sheet image are synthesized are displayed on the CRT display 18 through the composite processing unit 50 and the D/A converter 51. The operator visually confirms the composite state of the letters and the customer's image in the displayed composite image. When the operator confirms that these images are arranged as the normal images with their top directions coinciding with each other and that they are disposed at correct positions in correct sizes, he inputs that a result of the confirmation is acceptable. Then, the scanner 12 in the digital print system 10 prescans or main-scans the customer's image or instantly main-scans the customer's image when it was prescanned, the controller 14 subjects the resultant image data to the image pre-disposal processing and image disposal processing described above and thereafter the composite processing unit 50 executes the aforesaid processing for synthesizing the letters and the image. The resultant print image data is composite image data in which the letters, customer's image and background image are synthesized as normal images with their top directions coinciding with each other and the letters and the image are beautiful and correct.

In the digital print system, the operator can correct the composite image data, in particular, the position and size (magnification) thereof displayed on the display 18 while observing the composite image displayed on the monitor 18 because the composite image is displayed thereon approximately at real time, in particular, in the video mode. More specifically, the operator can execute the correction by adjusting the position, the direction and the top and bottom of a film original as a customer's image and a reflected original by the carrier of the scanner 12, by moving and turning a scan image or adjusting the size and magnification thereof by the imaging lens unit 34, in particular, when the scan image is vignetted or by electronically adjusting the position and magnification. When the letters of the displayed composite image are to be corrected, composite image in which correct letters are synthesized in a correct direction can be displayed on the display 18 by inputting correct letters through the keyboard 22*a* or the mouse 22*b* or changing the top and bottom of the letters registered to the job file. When the template image and the predetermined image assembled are to be corrected, composite image in which a correct template image is synthesized can be displayed on the display 18 by inputting or designating a correct image or a number or a symbol of the correct image through the keyboard 22*a* or the mouse 22*b* and registering it to a job file. The resultant print image data is composite image data in which the customer's image is correctly inserted into a desired region of the background image, the entire images including the letters are synthesized as normal images each other and the letters and images are beautiful and correct.

When the composite print image data is obtained for one case as described above, the resultant composite image data is stored in the memory 42 by the CPU 40, although it may be directly supplied to the printer 16 from the composite processing unit 50 to output the print image P. A predetermined number of composite image data for one lot covering respective cases are stored in the memory 42 as described above. Then, the image composite disposal process F4 is finished. A print disposal process F5 and a paper developing process F6 will be subsequently executed, although a composite image data creating job for a next lot may be carried out thereafter.

In the print disposal process F5, the composite image data for the respective cases in one lot are transmitted from the memory 42 to the printer 16 by the CPU 40 of the controller 14 in the sequence they are registered to a job file, a roll-shaped photosensitive material corresponding to a necessary number of sheets registered to the respective cases are exposed by the exposing unit 58 which is controlled by the exposure controller 56 in accordance with the transmitted composite print image data and prints having the necessary number of composite print images recorded on the roll-shaped photosensitive material are output.

Subsequently, the roll-shaped photosensitive material (paper) on which the latent images of composite print images are formed for one lot or several lots is subjected to paper developing processing in a state of the roll in the developing unit 60 and a predetermined amount of the developed photosensitive material on which print images P are formed as visible images are wound to a roll shape. Thereafter, the roll-shaped photosensitive material having been developed is inspected.

The roll-shaped photosensitive material on which the necessary number of the print images P are formed for the respective cases in at least one lot is set to the bonding machine 24 together with postal cards CRD which are selected or prepared by the user for respective cases previously registered to the job file and cut for the respective print images P and the resultant print images P are bonded to the postal cards CRD for the respective cases. When the top of the roll-shaped print images P is set in a direction where the print images P are set as normal images in correspondence to the top direction of the postal cards CRD to be set at the time, the bonding job can be automatically carried out by the bonding machine 24 for one lot or several lots.

The resultant picture postcards PC are classified for the respective cases in one lot, checked with the order sheets of the customer, the number and the like thereof are inspected and then accommodated in order bags (Envelopes).

The image synthesizing method of the present invention is fundamentally arranged as described above.

Specific examples of functions and specifications of the respective processing sections of the flow of the picture postcard system shown in FIG. 4 will be shown below. F1. Sorting process (i) Sorting and Composition of Lot ① Correspondence between a card type which shows a type of postal cards and a type of templates serving as background images and a film is checked.

Letters are checked and an inquiry is made to the user, when necessary.

② Grouping is made depending upon a card type, a case in which trimming is required and a case in which trimming is not required.

The same type of films and cases having the same requirement to trimming are grouped into the same lot to eliminate the replacement of a carrier in the same lot.

③ Order bags (Envelopes) for about 20 cases are arranged as one lot in the sequence of the order bags received earlier, a lot card is attached to the bags and the bags are bundled. For example, 20.6 m (=149 mm×70 sheets×20)<280 mm (=length of wound paper)

The lot card has job check sections for respective processes and is finally printed onto a color paper (CLP) and checked with a lot dividing card. A check tape is bonded on the Envelopes, films and order sheets.

④ Special Cases

The following special cases can be processed when a different case No. is allocated to them (two check tapes are bonded on the same Envelopes) and the following jobs are registered. However, since a process is made complex at the time, it is preferable to process them by classifying them to respective cases.

A: the same negative film·a plurality of letters

B: the same negative film·a plurality of types

C: a plurality of negative films·the same letter

D: a plurality of negative films/a plurality of types·the same letter (ii) Job Registration ① Registration of Job File A job file is prepared by inputting the following items for each case.

(1) lot No., (2) case No., (3) shop Code, (4) bag code, (5) order symbol, (6) designation of longitudinal/lateral direction, (7) designation of postal card, (8) number of ordered sheets, (9) type of film, (10) frame No. (11) print magnification, (items (9) to (11) are necessary for respective images), and the like are designated and a job file is prepared for each case.

Reference is made to the sections of data definition (Table 1 to table 5) as to the content of the job file.

In case of the type A in which (6) designation of longitudinal/lateral direction is included in (5) order symbol, the card type is prepared by eliminating designation of longitudinal/lateral direction from (5) order symbol and longitudinal/lateral direction is designated in card PL.

| Type | Order symbol | Designation of film longitudinal/lateral direction | Card Type | Card PL |
|---|---|---|---|---|
| A type | XXXXXXY | nil | XXXXXX | Y |
| B type | XXXXXX | Y | XXXXXX | Y |

Y shows the designation of the longitudinal/lateral direction of a film, T shows a longitudinal direction and Y shows a lateral direction (refer to Table 1).

A print magnification is designated as PrintMag in the scan image conditions of a job file only when it is designated in a template attribute definition. A value of the print magnification can be changed.

② A job file having been registered can be displayed as a list and the content of the job file can be displayed for each case.

③ A job file having been registered and the letters and image data relating to the job file can be deleted. It can be designated whether they are to be deleted collectively or selectively.

Although the user may delete them when PrintStatus=0 while observing a status file, it is preferable to delete them after a confirmation screen is checked.

④ When a job is registered, XXXXXX.STS, a job status file is created. The job status file has the following content.

| EditStatus = n; | 0: print bitmap (BMP not created) |
| | 1: print BMP created, 0 being set at the start of creation |
| Print Status = n; | 0: print not finished, 1: print finished, 0 being set at the start of creation |

(iii) Media

① Media as many as lots which will be processed per day are previously prepared and a lot No. is attached thereto. Since one system processes 200 cases per day at the maximum, at least ten sheets of the media are prepared. When it is supposed that only correction which occurs in a laboratory is coped with, it is sufficient to prepare about 20 sheets of the media taking a case which is processed in two or more days into consideration. However, when correction requested from the customer is also coped with, a number of the media is increased and must be determined as necessary.

② In case of an on-line server, an image disc having a capacity of 6 GB (=(15 MB/case)×400 cases) is necessary when the disc is kept for two days as a rule.

F2. Image Scan (i) Operation Image

A picture postcard job which will be output to the outside is selected on an operation base screen. When necessary, a carrier is replaced at the extreme end of a lot. When trimming is necessary, a trimming carrier is set and a trimming mode is selected on a screen.

(ii) Setting of Negative Film

A negative film is taken out from an order bag (Envelopes) and set to a carrier.

(iii) Designation of Output File

① The following operations can be executed in an automatic external output (tentative name) mode.

A list of Job files in a current directory region (DIR) can be displayed on a job processing screen in an ASCII ascending order.

A plurality of job files can be selected by the operation of the user. First, all the job files in the DIR is selected.

Only the selected job files can be designated (supported by Clic, Shift+Clic, Ctrl+Clic selection system).

A print job screen displays the followings and a content to be displayed is determined by a job file:
  lot No.: a lot No. is displayed;
  case No.: a current case No. is displayed; card type name+designated longitudinal/lateral direction is displayed;
  size: scan size is displayed (main scan×sub-scan mm)
  output file name: an output file name is displayed; and
  image No. print magnification, frame No. film type, image top direction are displayed.

The operator changes a magnification, moves a frame and designates the turn of an image while observing the above displays. The operator performs a turning operation so that a designated top direction coincides with the top direction of a displayed image (indicates to turn the image 180° or to turn a trimming carrier.

A film drive key on the print job screen indicates a manual operation or a trimming operation.

On the completion of a print indication, the next entry will be processed. An image is saved to a file in so that the top direction of image data designated to a job file coincides with a criterion indicating an image top direction.

In case of an advanced photographic system (APS), a front letter is not synthesized with a scan image.

If there is already a bitmap (BMP) image having the same file name, it is overwritten by a scan operation.

F3. Input of Letters (i) Input of Address and Name

① A job file in media is selected. Lot No., case No., card type, designation of a longitudinal/lateral direction to a negative film and letter No. are read from the job file. A dedicated letter input machine (WAVE made by Fuji Color Sales Co.) specifies the followings by card type+designation of longitudinal/lateral direction+letter No.
  ○ Letter area type→"address/name", "arbitrarily-created sentence", "title", etc.
  ○ Letter area size A card type design is previously caused to coincide with the function of WAVE to process them.

② An address and name are input by an operation similar to that of the present WAVE.

③ Input information is converted into a postscript format (EPS). Postscript data is output to a file name designated to the job file.

④ The above operations are repeated until no job file remains in the media.

Defects of an order sheet are often found in the letter input process. In such a case, a process executed at the time is returned to a previous process in a unit of lot. However, when a priority is given to the processing of a lot, a job may be deleted on a job registering screen.

(ii) Input of Title Sentence and Arbitrarily-created Sentence

Sentences in an extent which can be covered by WAVE are input by it and sentences which are beyond the capability of WAVE are input by Photoshop of Adobe Co. or externally created.

F32. Creation of Bitmap (i) Creation of bitmap

[In case of WAVE]

① Postscript (PS) data is subjected to 6×6 anti-aliasing processing by a PS (postscript)–RIP (raster image processor) and filed (a middle tone is created to a contour portion by executing the 6×6 anti-aliasing processing, and a format is arranged as a TIF format).

A data size is 8 bits/pixel. Since a letter data portion is placed on an image behind a template, it is desired to make the portion other the letter portion transparent. Thus, 0×FF is handled as transparent. Ordinarily, black is represented by 0 in the letter portion.

A maximum data amount of the bitmap created above is about 1.2 MB/case supposing that one surface of a card is occupied by an address, name and arbitrarily-created sentence.

[In case of other processing systems]

Other processing systems are fundamentally the same as the above system. When a true type font (Appele Co.) is used, points to be created are multiplied by n and an n×n averaging process is performed likewise the above.

It is preferable to cover the following letter input themes.

Brush-written font, square style font, etc.

User-defined letter creating utility

Increase of a degree of freedom when letters are input:
① input of letters to the outside of a region; ② combination of already created sentences; and ③ partial or entire deletion of already created sentence Coloring of letters and logos→Designation of DIC color numbers F4. Combination of Images (i) Letters and Image Data are Synthesized to a Template.

The template is arranged as described below:

① the template includes position, size information, upward/downward direction and turn indicating information of letter bitmap data (input through WAVE) and scan image data with respect to a layout coordinate system based on a print size;

② the template includes a single or a plurality of bitmap images (arbitrary illustrations and logos);

③ when a letter bitmap (input through WAVE) is placed on background, a voided letter or a black letter can be designated (a letter color can be designated);

④ letters designated to a template (for example, an already created greeting sentence, an illustration and the like can be designated to a specific region and placed on a scan image, and, at the time, it is possible to designate whether it is placed in a black letter, in a voided letter or in a pixel value as it is; and ⑤ scan image mask data (for masking a disposed image), rectangular region, round corner, blurred combination, etc.

The bitmap is created by a separate tool such as Photoshop, etc.

A. Composite Image Display/Edit Function

A composite image of letters and an image are displayed based on a template definition.

A mask image will be processed as described below.

Intermediate images are obtained by performing transparent composite processing using the pixel value of an uppermost layer and a scan image. A mask image has a value 0–255. When the mask value is shown by A, template data are shown by Br, Bg, Bb and scan image data are shown by Cr, Cg, Cb, the intermediate images R, G, B can be determined from the following formulas.

R=(Cr−Br)×A/255+Br

G=(Cg−Bg)×A/255+Bg

B=(Cb−Bb)×A/255+Bb

A letter bitmap (input through WAVE), template letters and an illustration are placed on an image, adapting processing will be effected to the image. When letters are placed on the image, a gray control will be performed.

An image is synthesized with a template by causing the image to coincide with the center of an image inserting region and automatically turning the image in accordance with the information of an image top direction in a job file (the top direction of a print image must coincide with the top direction of an inserted image).

The operator can make fine adjustment of the disposition of letters, image and the like while observing a display. Since the bitmap of a letter and image may be larger than a corresponding region of the template, they are synthesized by being positioned using their upper left position as a reference after they are turned. A function for turning an image in a unit of 90° and a function for turning it by θ are available.

Correction on a part level is executed by returning a process to a previous process.

When a confirmed display is acceptable, a final print image is automatically synthesized.

A zoom display function is available to eliminate a mistake in layout due to a difference of resolutions between a displayed image and a printed image (scan image: 50%–200%, composite image: 10%–1000%).

Display corresponds to 24 bits (full color pair). A CRT has 800×600 pixels as a standard.

B. Update of Status File

When print BMP is normally created by a composite unit, a change to EditStatus=1 is carried out. When a disadvantage arises in combination, the user can select the followings.

① BMP is created, a file name is set to xxxxxx and ERR is set to EditStatus=1. (To permit the user to correct a manual by Photoshop)

② Otherwise, BMP is not created and EditStatus=0 is set. The file name remains XXXXXX.JOB.

③ A target productivity is 144 seconds/case.

F5. Print (i) Print of Composite Image (exposure and print)

① It is possible to select a plurality of print image files on an automatic external input screen and execute print automatically.

A list of job files is displayed.

The job files to be output can be designated to "all the job files in the DIR" and "only the selected job files (supported by Clic, Shift+Clic, Ctrl+Clic selection system)".

The job file displays lot. No., case No., print size, number of sheets, file name of print image, card type, designation of longitudinal/lateral direction of a negative film, film type and image direction.

The jobs of the above items to be output are printed out at the start of print.

Automatic print can be interrupted.

A print-indicated item can be cancelled (similar to prior art print cancel operation).

② An image file IF is composed of the following two files:

a print image arranged as BMP;

a print job file to which print information is designated.

(Note): A print request to the output machine 16 is effected as designated by a job file regardless of whether a border is formed or not. A number of pixels designated by a BMP header is transferred.

③ Bonding and check functions are as follows:

a print function of a lot dividing card (on which print date and time, lot No. case No., etc. are printed);

an image direction is caused to coincide with a postal card direction.

④ A automatic backside print turn-off function is available:

Function for forcibly turning off backside print is added when a paper is thin and a picture postcard is externally input.

⑤ Test print can be carried out every n sheets.

When test print is carried out on an ordinary print job screen, letters can be printed on a backside and output.

Print of letters on the backside is turned on and off by the input machine.

Auxiliary function for replacing paper is not necessary.

⑥ A status file is handled as described below.

When print is carried out:

a. A job in which a file name is xxxxxx. ERR is excluded from a display (print cannot be carried out.).

b. The job is processed as follows.

| Edit Status | Print status | Display on screen |
|---|---|---|
| 0 | 0 | displayed |
| 0 | 1 | displayed |
| 1 | 0 | displayed |
| 1 | 1 | displayed |
| Automatic print selection | | When print is finished |
| not selected | | *1 |
| not selected | | *1 |
| selected | | print status = 1 |
| not selected | | *1 |

*1 is handled as follows.

The job can be selected by a manual operation and printed.

PrintStatus is changed to 1 after the completion of print.

In on-line operation, a status file is not exclusively controlled for the moment.

Since the DP file is circulated, no access competition basically arises.

(ii) Print of Lot Separating Card

① A lot separating card is a dummy print on which the following contents are printed.

② Whether the lot separating card is to be printed or not can be set on an operation screen ③ When the print function of the lot separating card is turned on, the following lot separating card is printed at the extreme end of the print of the first case of a plurality cases which are indicated to be printed.

Lot separating card includes:

| | | | |
|---|---|---|---|
| print date and time YYYY/MM/DD | | HH:MM | ← 20 points |
| lot No. | lot No. | XXXXX | ← 20 points |
| case No. | XXXXXX | | ← 20 points |

F6. Paper Development (i) A Paper are Developed.

① The paper is developed in a rolled state.

At the time, the paper is naturally wound reversely. A paper developing machine has a maximum handling length.

(ii) Roll Inspection

② A Developed Roll is Inspected.

F7. Bonding (i) Bonding of Postal Card

① Type of bonding machine

FPX-4000 (both-side tape type) (made by Nexus Co.)

FPC-5000II (water adhesive type) (made by Nexus Co.)

F8. Check (i) Postal Cards are Checked Against Order Sheets. The Number of Postal Cards are Inspected.

TABLE 1

[JOB] Section (stores information commonly necessary in postcard system)

| Key name. | Data Format | | Lot No. | Input source |
|---|---|---|---|---|
| Lot No | cccccc; | half size alphanumeric letters max. 6 digits discrimination between large and small English letters not effected | lot No. | operator |
| Serial No. | nnnnnn; | half size numerals, insert 0 to vacant digits from upside | Case No. | operator/automatic |
| Store Code | nnnnnn; | half size numerals, insert 0 to vacant digits from upside | shop code on DP bag | operator |
| DpCode | nnnnnn; | half size numerals, insert 0 to vacant digits from upside | bag code on DP bag | operator |
| KindOfPostcard | n; | half size numerals selected from 1. greeting card 2. cherry mail postal card 3. seagull mail postal card 4. official postal card 5. private postal card | postal card designation | operator |
| CardType | XXXXXX; | special alphanumeric letters max. 6 characters | obtained by eliminating longitudinal/ lateral directions from order symbol | operator |
| CardPL | Y; | half size English letters selected from the followings T: longitudinal Y: longitudinal | designation of longitudinal/lateral directions, refer to F1 of function spec. of job registration | operator |
| Template | XXXXXX.CRD | | template attribute | registration section |

TABLE 1-continued

[JOB] Section (stores information commonly necessary in postcard system)

| Key name. | Data Format | Lot No. | Input source |
|---|---|---|---|
| Template Version | VXXXRXXX | file name, order No. template set version | registration sec. |
| SceanMakeImage | n | 0: color guaranteed 1: color not guaranteed | color space guarantee | registration section |
| NoOfScanImage | n; | half size numerals range 1–9 | number of scan images | template |
| NoOfCharImage | n; | half size numerals range 1–9 | number of images in letter part | template |

Note: the above row for SceanMakeImage spans columns; intended columns are Key name | Data Format | Lot No. | Input source as:
- SceanMakeImage | n | 0: color guaranteed / 1: color not guaranteed | color space guarantee | registration section

TABLE 2

[PRINT] Section (stores print conditions)

| Key name | Data Format | | Name/description | Input source |
|---|---|---|---|---|
| PrintFile | Pnnnnnn.BMP | "nnnnnn" shows case No. | Print Image File Name | Registration section |
| PrintSizeH | nnn.n; | half size numerals up to decimal point 1 10–210 mm | print size in width direction including border width unit: mm | template |
| PrintSizeV | nnn.n; | half size numerals up to decimal point 1 82.5–305 mm | print size in feed direction including border width unit: mm | template |
| Border | n; | half size numerals, selected from the followings 0: without border, 1: with border | whether border is designated or not, when boarder is not designated, four items of BorderHL BorderHR, BorderVU, BoaderVB are omitted, Version H8 is always 0 | template |
| BorderHL | nnn.n; | half size numerals up to decimal point 1 digit | size of border width on the left side in width direction, unit: mm | template |
| BorderHR | nnn.n; | half size numerals up to decimal point 1 digit | size of border width size on the right side in width direction, unit: mm | template |
| BorderVU | nnn.n; | half size numerals up to decimal point 1 digit | size of upper border width in feed direction, unit: mm | template |
| BorderVB | nnn.n; | half size numerals up to decimal point 1 digit | size of lower border width in feed direction, unit: mm | template |
| NoOfPrint | nnnnnn; | half size numerals max. 6 digits | number of prints | operator |
| FilmType | n; | half size numerals selected from the followings 1: type 1, 2: type 2 3: type 3, 4: type 4 | as film type, 4 is designated for the moment (however, 2: type 2 must be used for postcard print made by Fuji machine) | registration section |
| UpperOfPrintImage | n; | half numerals, designate print image top direction from 1: upward, 2: downward; 3: leftward, 4: rightward | top direction of print image designation of image print start direction | registration section |

Note for Table 2)

(Note 1) Digital Labo System "Frontier" (made by Fuji Photofilm Co.) has a function for forming a white border to the periphery of an image, and the function can be optionally used. When a border is not designated and an image width is smaller than a print width, the image is positioned at a center in a horizontal direction. When the image width is larger than a print width, the image is clipped with the center thereof in a width direction positioned at the center of the print. In any case, an entire image is output in a feed direction.

(Note 2) Since there is a possibility that the UpperOfPrintImage is changed for every laboratories to determine a direction of a paper when it is exposed, a value is set to a parameter file and the value can be changed for every laboratories.

(Note 3) Since printSizeH and printSizeV of the print section of the job file designate how a paper is exposed, only the following values are employed in a paper having a width of 102 in postal cards.

printSizeH=102.0;

printSizeV=146.0;

A top direction in image data is designated entirely independently of the above mentioned. It is sufficient that the top direction of the image data is caused to coincide with the top directions of attached BMP images. Frontier performs exposure in width 1.02×feed 146 and the image is turned so that it is fed to an output machine for exposure in a predetermined top direction in accordance with "Specification for Picture postcard System" (made by Fuji Photofilm Co.).

TABLE 3

[SCANn] Section (stores image scan conditions)
(n is set in accordance with scan image number. A first image is shown as [SCAN 1] and a third image is shown as [SCAN3]. This section will be defined as many as scan images.)

| Key Name | Data Format | | Name/description | Input source |
|---|---|---|---|---|
| ScanFileNo | m; | half size numerals range: 1–9 | scan image No. | template |
| ScanFile | Snnnnnnm. BMP | "nnnnnn" shows case No. "m" shows image No. | scan image file name | registration section |
| ScanImageH | nnn.n; | half size numerals up to decimal point 1 digit 10–305 | scan size in main scan direction, unit: mm | template |
| ScanImageV | nnn.n; | half size numerals up to decimal point 1 digit 10–305 | scan size in sub-scan direction, unit: mm | template |
| PtintMag | nnnn; | half size numerals | print magnification, ScanImageH/V ÷ film input size % is designated. (Close-up is designated wen "C" is attached to the leading edge of card type.) Close-up is realized by controlling optical magnification. range of optical magnification: 0.42–0.8 Optical magnification is not designated unless close-up is performed. (Details will be described later.) | template/operator |
| NoOfFrame | XXX; | half size numerals max. 3 digits | frame No. (order film No.) | operator |
| FilmType | n; | half size numerals, designated from: 1: 135 negative 2: 135 positive 3: 240 negative 4: 240 positive 5: others | type of film to be scanned | operator |
| UpperOfScanImage | n; | half size numerals designate top direction of scan image from: 1: upward 2: downward 3: leftward 4: rightward | top direction of scan image | template |

Note for Table 3)
(Appendix) Specification when close-up is effected
A reading region on a negative film surface is set only
up to 18.8 × 12.9 in an opening mask ratio when optical
zooming is maximized.
In case of 135 film.
On negative film surface      Scan size (magnification)
23.7 × 18.3                  102 × 70 (430%)
optical zooming (o shows an optical aooming possible range
and * shows outside of the range.)
half size
o only close-up without date is also available
In case of 240 film
A close-up service is not available.
Since close-up is designated by a different order
symbol (C is attached to the order symbol), a template
dedicated to it is prepared and a scan image size and
PrintMag are previously designated to the template.
PrintMag is shown as follows.
scan size on template (lengthwise direction) ÷
negative film length of close-up No. × 100
When a job is registered, ScanImageH, ScanImageV,
PrintMag of a SCAN section are created from the above
template information.

TABLE 5

Details of template attribute file

| Item | Section | Key name | Data format | Name/description |
|---|---|---|---|---|
| 1 | template | TemplateName | XXXXXXY; | template name (card type + designation of vertical/ horizontal direction |
| 2 | | Resolution | nnn.nn; | resolution (fixed to 11.81) |
| 3 | | Unit | n; | unit 1: DPI, 2: mm (mm fixed) |
| 4 | | CardSizeH | nnn.n; | designate length in main scan direction in which print is output fixed to 102 in case of postcard |
| 5 | | CardSizeV | nnn.n; | designate length in sub-scan direction in which print is output fixed to 145 in case of postcard |
| 6 | | CardPixH | nnnn; | output print (=entire template size) designate number of pixels in main scan direction fixed to 1228 in case of postcard |
| 7 | | CardPixV | nnnn; | output print (=entire template size) designate number of pixels in sub-scan direction fixed to 1750 in case of postcard |
| 8 | | UpperOfTemplateImage | n; | top direction of template image file<br>1: image upper side facing top<br>2: image lower side facing top<br>3: image left side facing top<br>4: image right side facing top |
| 9 | | NoOfTemplateImage | n; | number of template images (1–9) |
| 10 | | TemplateImageFile1 | XXXXXXYn. BMP; | file name of template image template name "XXXXXY" + template image No. + extension ".BMP" |
| 11 | | TemplateImageFileHPos | XXXX; | position where CardPixH of template image disposed on pixel coordinate |
| 12 | | TemplateImageFileVPos | XXXX; | position where CardPixV of template image disposed on pixel coordinate |
| 13 | | TemplateMaskFile | XXXXXXYM.BMP; | file name of template mask image template name "XXXXXY" template mask image identifier "M" + extension ".BMP" |
| 14 | | TemplateMaskFileHPos | XXXX; | position where CardPixH of template mask image disposed on pixel coordinate |
| 15 | | TemplateMaskFileVPos | XXXX; | position where CardPixV of template mask image disposed on pixel coordinate |
| 16 | | NoOfScanImage | n; | number of inserted scan images (1–9) |
| 17 | | NoOfOnImage | n; | number of specific regions (0–9) to be placed on template image |
| 18 | | NoOfCharImage | n; | number of user's letter images (0–9) |
| 19 | Print | PrintSizeH | nnn.n; | print size in width direction including border width, unit: mm |
| 20 | | PrintSizeV | nnn.n; | print size in feed direction including border width, unit: mm |
| 21 | | Border | n; | whether border is designated or not;<br>0: without border<br>1: with border |
| 22 | | BorderHL | nnn.n; | size of boarder width on the left side in width direction unit: mm |
| 23 | | BorderHR | nnn.n; | size of boarder width on the right side in width direction unit: mm |
| 24 | | BorderVU | nnn.n; | size of boarder width on upper side in feed direction unit: mm |
| 25 | | BorderVB | nnn.n; | size of boarder width on lower side in feed direction unit: mm |
| 26 | ONIMAGBn | OnImageNo | n; | specific region No. (1–9) |
| 27 | | OnImageType | n; | designation of composite processing method<br>1: black letters,<br>2: voided letters<br>3: simply placing<br>*: in 1 and 2, ONIMAGR is anti-aliasing letter and adapting processing is performed to black/white processing in composition;<br>in 3, ONIMGER is logo, illustration, non-anti-aliasing letter, etc. and they are simply placed on background. |
| 28 | | ChaImageHPos | XXXX; | coordinate in main scan direction from upper left side on template image |
| 29 | | CharImageVpos | XXXX; | coordinate in sub-scan direction from upper left side on template image |
| 30 | | CharImageWidth | nnnn; | number of pixels in main scan direction in specific region |
| 31 | | CharImageHight | nnnn; | number of pixels in sub-scan direction in specific region |
| 32 | SCANn | ScanImageNo | n; | Scan image No. (1–9) |
| 33 | | ScanImageHpos | XXXX; | coordinate in main scan direction from upper left side on template image |
| 34 | | ScanImageVpos | XXXX; | coordinate in sub-scan direction from upper left side on template image |
| 35 | | ScanImageWidth | nnn.n; | size (mm) of scan image in main scan direction |

TABLE 5-continued

Details of template attribute file

| Item | Section | Key name | Data format | Name/description |
|---|---|---|---|---|
| 36 | | ScanPixWidth | nnnn; | size (number of pixels) of scan image in main scan direction |
| 37 | | ScanImageHight | nnn.n; | size (mm) of scan image in sub-scan direction |
| 38 | | ScanPixHight | nnnn; | size (number of pixels) of scan image in sub-scan direction |
| 39 | | UpperOfScanImage | n; | designate top direction of image in scan image file<br>1: image upper side facing top<br>2: image lower side facing top<br>3: image left side facing top<br>4: image right side facing top |
| 40 | | PrintMag | nnnn; | to be designated to image scan conditions of job file, not to be designated unless close-up is employed (unit: %) |
| 41 | CHARn | CHARImageNo | n; | user's character image No. (1–9) |
| 42 | | CharType | n; | designate color when combination is performed<br>1: black letter,<br>2: voided letter |
| 43 | | CharImageHpos | XXXX; | coordinate in main scan direction from upper left side on template image |
| 44 | | CharImageVpos | XXXX; | coordinate in sub-scan direction from upper left side on template image |
| 45 | | CharImageWidth | nnnn; | number of pixels of user's letter image in main scan direction |
| 46 | | CharImageHight | nnnn; | number of pixels of user's letter image in sub-scan direction |
| 47 | | UpperOfCharImage | n; | top direction of image in user's character image file<br>1: image upper side facing top<br>2: image lower side facing top<br>3: image left side facing top<br>4: image right side facing top |
| 48 | | CharPL | X; | T: vertical writing,<br>Y: horizontal writing |

Note for Table 5)
Supplementary Explanation:

① TemplateImageFile1—TemplateImageFile1VPOS are prepared as many as NoOftemplateImage. At the time, they are shown as TemplateImageFile2—TemplateImageFile2VPOS, TemplateIimageFile3—TemplateImageFile3VPos . . .

② ONIMGEn sections are actually prepared as many as NoOfScanImage and shown as ONIMAGE1, ONIMAGE2 . . .

③ SCANn sections are actually prepared as many as NoOfScanImage and shown as SCAN1, SCAN2 . . .

④ CHARn sections are actually prepared as many as NoOfCharImage and shown as CHAR1, CHAR2 . . .

⑤ The image value 255 of ONIMAGE means transparent and background is employed in combination.

⑥ When a border is not designated, four items, BorderHL, BorderHR, BorderVU, BorderVB are omitted.

The customer's image used here may be an image recorded on a film original such as a negative film or a reversal film or may be an image of a reflected original. Therefore, it is preferable that the digital print system 10 is provided with both of a scanner for reading a film original and a scanner for reading a reflected original in accordance with the respective originals, although any one of them may be provided. Further, the predetermined image used here may be any of a letter, logo mark, illustration and the like so long as it is a line image and the letter may be any of a black letter, voided letter, outline letter, anti-aliasing letter, non-anti-aliasing-letter.

While the image synthesizing method of the present invention has been described above in detail, the present invention is not by no means limited to the above embodiment and it goes without saying that various improvements and modifications can be made within a scope which does not departs from the gist of the invention. For example, letter data such as an address, name, arbitrarily-created sentence of a user and the like may be letter data which have been stored in a recording medium such as an FD or the like, and a customer's original image and an image read from a customer's original may be image data which have been read from the original or image data which have been created by a computer or the like and stored in an image recording medium such as a FD, HD, MO and the like.

As described above in detail, according to the present invention, when a letter image, a background image and a read image are synthesized, a customer's original image having been read can be correctly and perfectly inserted into an image assembly region or an image frame which is located at a designated position in the background image and has a designated size and synthesized with the background image.

When a customer's original is set to the scanner once, the original image is automatically read and converted into read image data having a designated size and a designated resolution and the read image data can be automatically synthesized with the background image data so that it can be correctly inserted into the designated region of the background image.

Further, according to the present invention, the original image read by the scanner can be displayed on the monitor or the composite image can be displayed on the monitor so that the correctness and completeness of the read image which has been inserted into the background image and synthesized therewith can be confirmed on a composite print image displayed on the monitor, whereby the processes from the reading of the customer's original after the confirmation to the combination thereof with the background image data can be automatically carried out, in addition to the above advantages.

What is claimed is:

1. An image synthesizing method of creating digital composite image data by synthesizing a background image previously stored as digital image data and an image read from an original, comprising the steps of:

previously designating a position and a size of the read image which will be inserted into and synthesized with the background image on the background image of an output print;

scanning and reading the original by a scanner in accordance with the designated size and converting the read image into read image data having the designated size and a resolution of the output print; and automatically synthesizing the converted read image data and the background image data whose resolution is converted into the resolution of the output print and synthesizing the read image having the designated size at the position designated on the background image.

2. An image synthesizing method according to claim 1, wherein the original reading process performed in accordance with the designated size is a process for reading the entire image of the original and cutting out image data in a region which is inscribed in the entire image region of the read original and similar to the designated size from the entire image data read from the original.

3. An image synthesizing method according to claim 1, wherein the read image data having been converted is obtained by reading a region containing the image region previously designated to the original from the original image as much as possible by optically magnifying the region, cutting out the image data in the region which is inscribed in the read image region and similar to the designated size and converting the cut-out image data into read image data having the designated size and the resolution of the output print.

4. An image synthesizing method according to claim 1, wherein the read image data having been converted is data obtained by reading the entire image of the original, cutting out minimum image data containing the image region previously designated to the original and located in a region similar to the designated size and then electronically magnifying the cut-out image data.

5. An image synthesizing method according to claim 1, wherein the original image read by the scanner is displayed on a monitor and the read image is an image located in a region which is shown as a reference line on the original image displayed on the monitor.

6. An image synthesizing method according to claim 1, wherein the original image read by the scanner is synthesized with the background image and displayed on the monitor and the read image is displayed in an image frame which is shown as a reference line on the background image displayed on the monitor.

7. An image synthesizing method according to claim 5, wherein the read image displayed in the reference line on the monitor is adjusted by at least any one of the change of an optical magnification of the image pickup lens of the scanner, the positional adjustment of a carrier for holding the original, the positional adjustment of the original on the original carrier and the adjustment of the cut-out pixels of the image data cut out from the read original image data.

8. An image synthesizing method according to claim 5, wherein the read image in the reference line is displayed in enlargement on the monitor together with the reference line.

9. An image synthesizing method according to claim 5, wherein the read image displayed on the monitor is a prescan image read at a low resolution and after it is confirmed that the read image is proper, the original is read at a high resolution by the scanner which performs main-scan.

* * * * *